United States Patent
Murakami

(10) Patent No.: US 9,273,615 B2
(45) Date of Patent: Mar. 1, 2016

(54) CONTROL DEVICE OF INTERNAL COMBUSTION ENGINE, WORK MACHINE AND CONTROL METHOD OF INTERNAL COMBUSTION ENGINE

(71) Applicant: Komatsu Ltd., Tokyo (JP)

(72) Inventor: Kentaro Murakami, Chigasaki (JP)

(73) Assignee: Komatsu Ltd., Tokyo (JP)

( * ) Notice: Subject to any disclaimer, the term of this patent is extended or adjusted under 35 U.S.C. 154(b) by 71 days.

(21) Appl. No.: 14/365,696

(22) PCT Filed: Jul. 23, 2013

(86) PCT No.: PCT/JP2013/069918
§ 371 (c)(1),
(2) Date: Jun. 16, 2014

(87) PCT Pub. No.: WO2015/011784
PCT Pub. Date: Jan. 29, 2015

(65) Prior Publication Data
US 2015/0300270 A1    Oct. 22, 2015

(51) Int. Cl.
*F02D 11/00* (2006.01)
*E02F 9/20* (2006.01)
(Continued)

(52) U.S. Cl.
CPC ............ *F02D 11/105* (2013.01); *E02F 9/2075* (2013.01); *F02D 29/04* (2013.01); *F02D 41/3809* (2013.01); *Y10S 903/903* (2013.01)

(58) Field of Classification Search
CPC ....... F02D 11/00; F02D 11/105; F02D 29/04; E02F 9/2066; E02F 9/2075; Y10S 903/903
USPC .................................................... 701/22, 50
See application file for complete search history.

(56) References Cited

U.S. PATENT DOCUMENTS

| 4,018,316 A | * | 4/1977 | McQuinn ................ F16H 45/00 192/113.36 |
| 6,020,651 A | | 2/2000 | Nakamura et al. |

(Continued)

FOREIGN PATENT DOCUMENTS

| JP | 11-002144 A | 1/1999 |
| JP | 2005-168295 A | 6/2005 |

(Continued)

OTHER PUBLICATIONS

International Search Report dated Aug. 27, 2013, issued for PCT/JP2013/069918.

*Primary Examiner* — Thomas Tarcza
*Assistant Examiner* — Tyler J Lee
(74) *Attorney, Agent, or Firm* — Locke Lord LLP

(57) ABSTRACT

When an internal combustion engine that is provided in a work machine and that serves as a power source for the work machine is controlled, the following lines are used: a first equal throttle line which is defined to correspond to a case where an amount of fuel injection for the internal combustion engine is maximum where the rotation speed of the internal combustion engine is the same and so that an output of the internal combustion engine becomes constant, a second equal throttle line which is defined to correspond to a case where the amount of fuel injection for the internal combustion engine is zero where the rotation speed of the internal combustion engine is the same and so that the torque decreases with increase of the rotation speed, and a third equal throttle line which is obtained from the first equal throttle line and the second equal throttle line.

12 Claims, 14 Drawing Sheets

(51) Int. Cl.
  *F02D 11/10*   (2006.01)
  *F02D 29/04*   (2006.01)
  *F02D 41/38*   (2006.01)

(56) References Cited

U.S. PATENT DOCUMENTS

| | | | | |
|---|---|---|---|---|
| 6,360,724 | B1 * | 3/2002 | Suhre | F02D 17/02 |
| | | | | 123/198 F |
| 6,708,787 | B2 * | 3/2004 | Naruse | B60K 6/12 |
| | | | | 180/53.8 |
| 6,820,356 | B2 * | 11/2004 | Naruse | E02F 9/2221 |
| | | | | 37/348 |
| 8,424,302 | B2 * | 4/2013 | Morinaga | B66F 9/22 |
| | | | | 60/422 |
| 2007/0132245 | A1 * | 6/2007 | Duesterhoeft | F01D 15/10 |
| | | | | 290/27 |
| 2009/0320461 | A1 * | 12/2009 | Morinaga | B66F 9/22 |
| | | | | 60/431 |
| 2012/0088621 | A1 * | 4/2012 | Kasuya | B60K 6/387 |
| | | | | 475/5 |
| 2014/0107878 | A1 * | 4/2014 | Takahashi | B60W 20/00 |
| | | | | 701/22 |
| 2014/0365056 | A1 * | 12/2014 | Ando | B60K 6/445 |
| | | | | 701/22 |

FOREIGN PATENT DOCUMENTS

| | | |
|---|---|---|
| JP | 2007-120426 A | 5/2007 |
| JP | 2012-241585 A | 12/2012 |
| WO | WO-2013/103133 A1 | 7/2013 |

\* cited by examiner

CONTROL DEVICE OF INTERNAL COMBUSTION ENGINE, WORK MACHINE AND CONTROL METHOD OF INTERNAL COMBUSTION ENGINE

FIELD

The present invention relates to a technique for controlling an internal, combustion engine provided in a work, machine including a construction machine such as an excavator, a bulldozer, a dump truck, and a wheel loader.

BACKGROUND

The work machine has, for example, an internal combustion engine serving as a power generation source for generating power for driving or generating power for operating a work instrument. For example, diesel engine (hereinafter referred to as an engine as necessary) is used as the internal combustion engine. For example, a technique disclosed in Patent Literature 1 is known as a technique for controlling an engine of a work machine.

CITATION LIST

Patent Literature

Patent Literature 1: Japanese Patent Application No. 2011-111387

SUMMARY

Technical Problem

In order to improve the versatility when controlling an engine, there is a demand to perform control by giving a control device of the engine a command value based on a fuel adjustment dial (throttle dial) or a command value of the same type as this. In the technique described in Patent Literature 1, the engine is controlled by using an equal engine horsepower curve, and therefore, the technique described in Patent Literature 1 cannot cope with such demand, and there still is a room for improvement.

It is an object of the present invention to realize control of an engine by giving a control device of the engine a command value based on a fuel adjustment dial or a command value of the same type as this, when the engine provided in a work machine is controlled.

Solution to Problem

According to the present invention, a control device of an internal combustion engine, wherein when the control device controls the internal combustion, engine that is provided in a work machine and that serves as a power source for the work machine, the control device controls driving state of the internal combustion engine by using: a first relationship of a torque and a rotation speed of the internal combustion engine which is defined to correspond to a case where an amount of fuel injection for the internal combustion engine is maximum at each rotation speed of the internal combustion engine and so that an output at a rotation speed to generate a rated output of the internal combustion engine is equal to or more than the rated output; a second relationship of the torque and the rotation speed of the internal combustion engine which is defined to correspond to a case where the amount of fuel injection for the internal combustion engine is zero at each rotation speed of the internal combustion engine and so that the torque of the internal combustion engine decreases in accordance with increase of the rotation speed of the internal combustion engine, where a point where the torque and the rotation speed of the internal combustion engine are zero is defined as a start point; and a third relationship which is a relationship of the torque and the rotation speed of the internal combustion engine, which is obtained from the first relationship and the second relationship.

In the present invention, it is preferable that the driving state of the internal combustion engine is controlled using the third relationship that matches a fourth relationship of the torque and the rotation speed of the internal combustion engine which is defined, so that an output of the internal combustion engine becomes constant; and a fifth relationship of the torque and the rotation speed of the internal combustion engine which is set so that a fuel consumption rate with respect to the output of the internal combustion engine becomes the smallest.

In the present invention, it is preferable that the driving state of the internal combustion engine is controlled so as to attain the rotation speed and the torque where the third relationship matches the fifth relationship.

In the present invention, it is preferable that further, the driving state when a load of the internal combustion engine decreases is controlled using a sixth relationship of the torque and the rotation speed of the internal combustion engine, which is defined from a no-load maximum rotation speed which is a maximum rotation speed of the internal combustion engine when the load of the work machine decreases.

In the present invention, it is preferable that the sixth relationship is a relationship in which, as the rotation speed increases, the torque decreases.

In the present invention, it is preferable that the first relationship is defined to attain an output larger than an upper limit value that can be actually output by the internal combustion engine.

According to the present invention, a work machine comprises: an internal combustion engine; and a control device of the internal combustion engine, wherein the control device controls driving state of the internal combustion engine by using: a first relationship of a torque and a rotation speed of the internal combustion engine which is defined to correspond to a case where an amount of fuel injection for the internal combustion engine is maximum at each rotation speed of the internal combustion engine and so that an output at a rotation speed to generate a rated output of the internal combustion engine is equal to or more than the rated output; a second relationship of the torque and the rotation speed of the internal combustion engine which is defined to correspond to a case where the amount of fuel injection for the internal combustion engine is zero at each rotation speed of the internal combustion engine and so that the torque of the internal combustion engine decreases in accordance with increase of the rotation speed of the internal combustion engine, where a point where the torque and the rotation speed of the internal combustion engine are zero is defined as a start point; and a third relationship which is a relationship of the torque and the rotation speed of the internal combustion engine, which is obtained from the first relationship and the second relationship, and wherein the driving state of the internal combustion engine is controlled using the third relationship that matches: a fourth relationship of the torque and, the rotation speed of the internal combustion engine which is defined so that an output corresponding to a command value of an output of the internal combustion engine becomes constant; and a fifth relationship of the torque and the rotation speed of the internal combustion engine which is set so that a fuel consumption rate with respect to the output of the internal combustion engine becomes the smallest, and wherein further, the driving state when a load of the internal combustion engine decreases is controlled using a sixth relationship of the torque and the rotation speed of the internal combustion engine, which is defined from a no-load maximum rotation speed which is a maximum rotation speed of the internal combustion engine when the load of the work machine decreases.

In the present invention, it is preferable that the work machine comprises: the internal combustion engine; an electric power generator motor driven by the internal combustion engine; a battery device accumulating electric power; an electric motor that is driven by receiving the electric power discharged from the battery device or electric power generated by the electric power generator motor.

According to the present invention, a control method of an internal combustion engine, wherein when the internal combustion engine that is provided in a work machine and that serves as a power source for the work machine is controlled, the control method comprises: detecting driving state of the work machine, and based on the detected driving state, controlling the driving state of the internal combustion engine by using: a first relationship of a torque and a rotation speed of the internal combustion engine which is defined to correspond to a case where an amount of fuel injection for the internal combustion engine is maximum at each rotation speed of the internal combustion engine and so that an output at a rotation speed to generate a rated output of the internal combustion engine is equal to or more than the rated output; a second relationship of the torque and the rotation speed of the internal combustion engine which is defined to correspond to a case were the amount of fuel injection for the internal combustion engine is zero at each rotation speed of the internal combustion engine and so that the torque of the internal combustion engine decreases in accordance with increase of the rotation speed of the internal combustion engine, where a point where the torque and the rotation speed of the internal combustion ti engine are zero is defined as a start point; and a third relationship which is a relationship of the torque and the rotation speed of the internal combustion engine, which is obtained from the first relationship and the second relationship.

In the present invention, it is preferable that the controlling includes using the third relationship that matches a fourth relationship of the torque and the rotation speed of the internal combustion engine which is defined so that an output of the internal combustion engine becomes constant and a fifth relationship of the torque and the rotation speed of the internal combustion engine which is set so that a fuel consumption rate with respect to the output of the internal combustion engine becomes the smallest to cause the internal combustion engine to generate an output corresponding to the fourth relationship.

In the present invention, it is preferable that the controlling includes controlling the driving state of the internal combustion engine so as to attain the rotation speed and the torque where the third relationship matches the fifth relationship.

The present invention can control an engine by giving a control device of the engine a command value based on a fuel adjustment dial or a command value of the same type as this, when the engine provided in a work machine is controlled.

DESCRIPTION OF EMBODIMENTS

A mode for carrying out the present invention (embodiment) will be hereinafter explained with reference to drawings.

Figure 1:
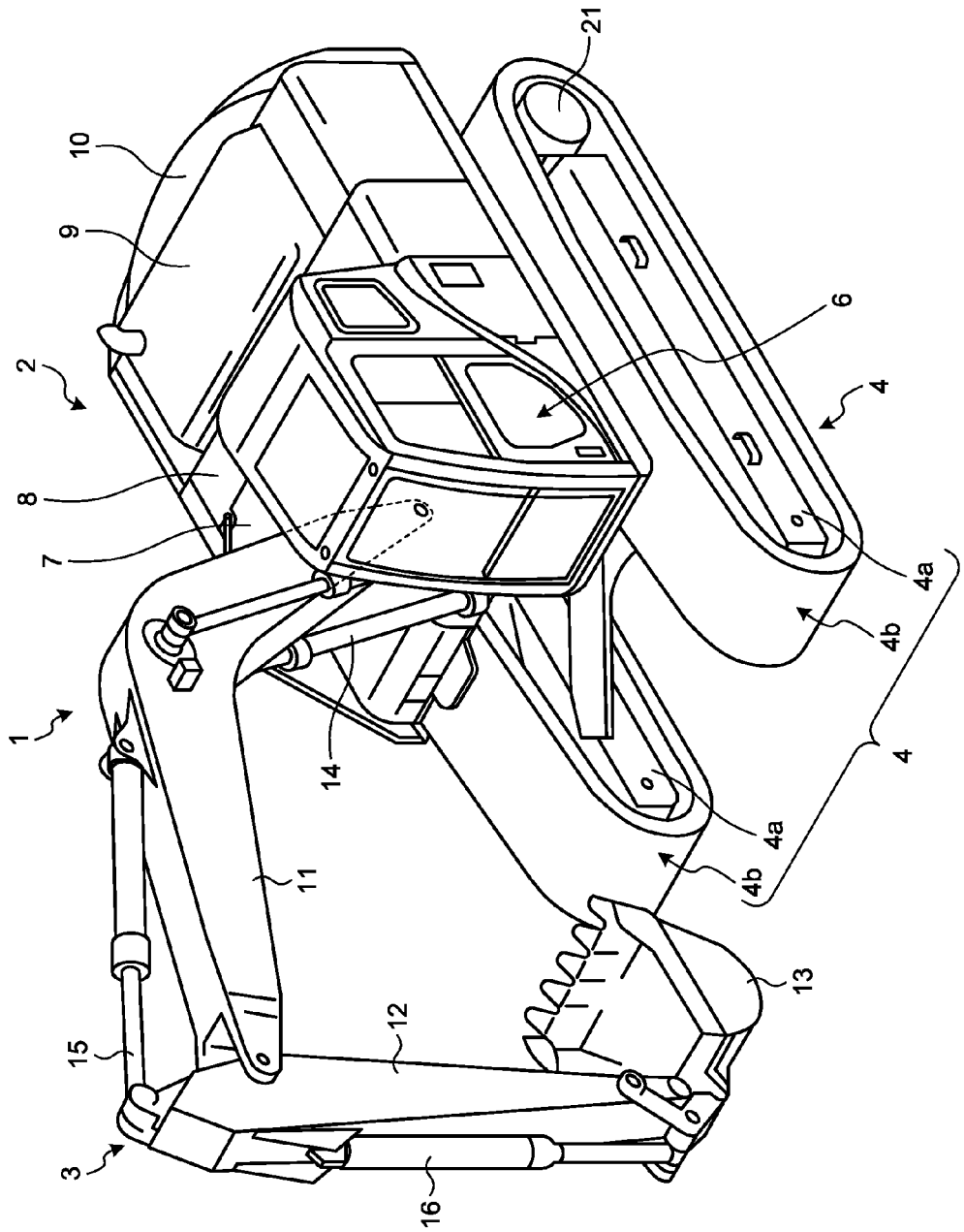
FIG. 1 is a block diagram illustrating an excavator according to the present embodiment.

FIG. 1 is a block diagram illustrating an excavator 1 according to the present embodiment. In the explanation below, the excavator 1 will be explained as a work machine, for example. In the present embodiment, the work machine may have an internal combustion engine serving as a bower generation source, and is not limited to the excavator 1.

<Excavator 1>

This excavator 1 includes a vehicle main body 2 and a work instrument 3. The vehicle main body 2 includes a lower running body 4 and an upper rotation body 5. The lower running body 4 includes a pair of running devices 4a, 4a. The running devices 4a, 4a include crawler track 4b, 4b, respectively. Each of the running devices 4a, 4a includes a running motor 21. The running motor 21 as shown in FIG. 1 drives the left-side crawler track 4b. Although not shown in FIG. 1, the excavator 1 also has a running motor for driving the right-side crawler track 4b. The running motor for driving the left-side crawler track 4b will be referred to as a left running motor, and the running motor for driving the right-side crawler track 4h will be referred to as a right running motor. The right running motor and the left running motor drives the crawler tracks 4b, 4b, thus running or rotating the excavator 1.

The upper rotation body 5 is rotatably provided on the lower running body 4. The excavator 1 is rotated by a rotation motor for rotating the upper rotation body 5. The rotation motor may be a hydraulic motor for converting pressure (hydraulic pressure) of operation oil into rotation force, or may be an electric motor for converting electric power into rotation force, or may be a combination of a hydraulic motor and an electric motor. In the present embodiment, the rotation motor is an electric motor.

The upper rotation body 5 is provided with a cab 6. Further, the upper rotation body 5 includes a fuel tank 7, an operating oil tank 8, an engine chamber 9 and a counter weight 10. The fuel tank 7 accumulates fuel for driving the engine. The operating oil tank 8 accumulates operating it which is discharged from a hydraulic pump to a hydraulic cylinder such as a boom cylinder 14, an arm cylinder 15, and a bucket cylinder 16 and a hydraulic device such as the running motor 21 and the rotation motor. The engine chamber 9 accommodates devices such as the engine and the hydraulic pump. The counter weight 10 is provided behind the engine chamber 9.

The work instrument 3 is attached to a central position at the front of the upper rotation body 5, and the work instrument 3 includes a boom 11, an arm 12, a bucket. 13, a boom cylinder 14, an arm cylinder 15, and a bucket cylinder 15. The base end portion of the boom 11 is coupled with the upper rotation body 5 with a pin. With such structure, the boom 11 rotates with respect to the upper rotation body 5.

The boom 11 is coupled with the arm 12 with a pin. More specifically, the front end portion of the boom 11 and the base end portion of the arm 12 are coupled with a pin. The front end portion of the arm 12 and the bucket 13 are coupled with a pin. With such structure, the arm 12 rotates with respect to the boom 11. The bucket 13 rotates with respect to the arm 12.

The boom cylinder 14, the arm cylinder 15, and the bucket cylinder 16 are hydraulic cylinders driven by operation oil discharged from the hydraulic pump. The boom cylinder 14 operates the boom 11. The arm cylinder 15 operates the arm 12. The bucket cylinder 16 operates the bucket 13.

(Driving System 1PS of Excavator 1)

Figure 2:
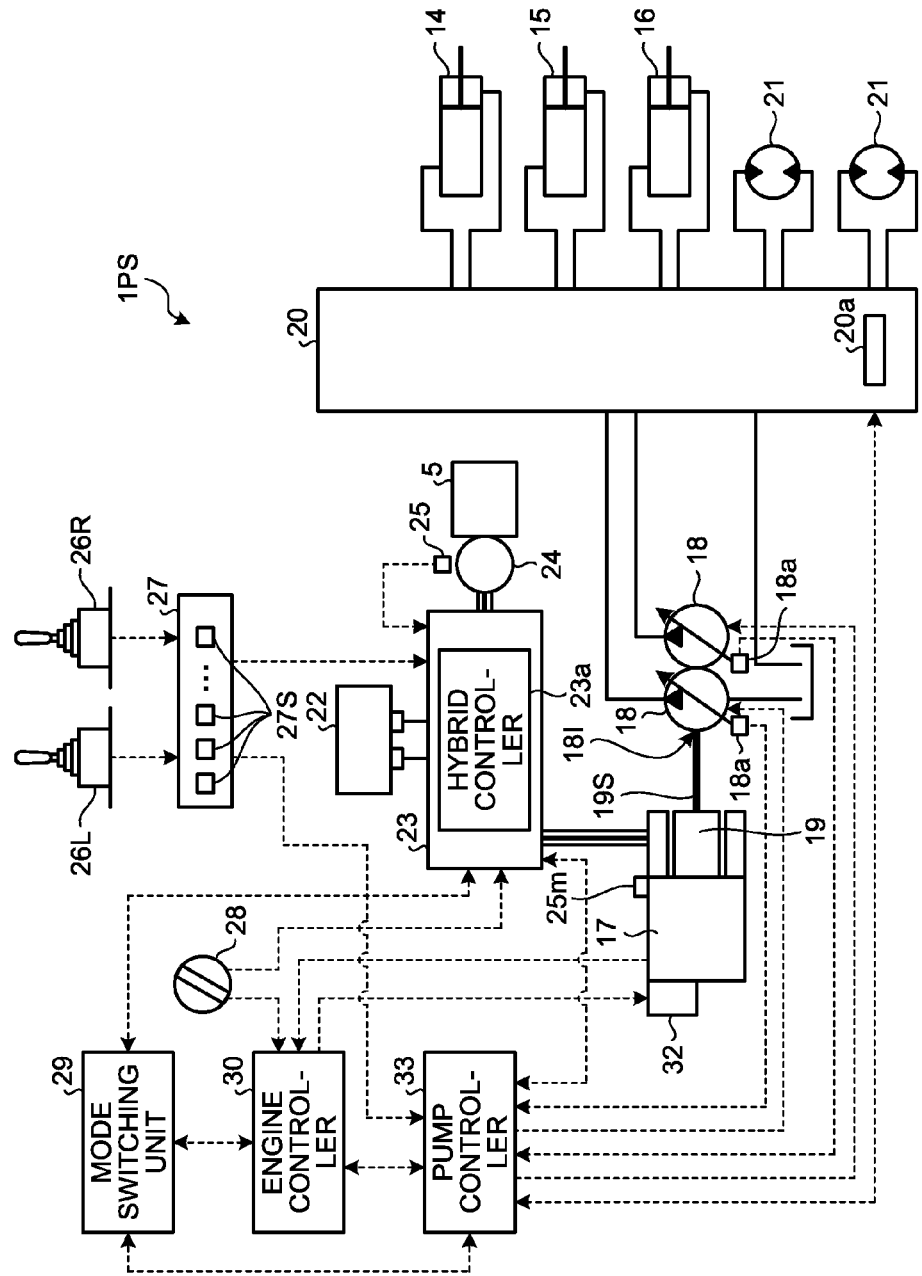
FIG. 2 is a schematic diagram illustrating a driving system of the excavator according to the present embodiment.

FIG. 2 is a schematic diagram illustrating a driving system for the excavator 1 according to the present embodiment. In the present embodiment, the excavator 1 is a hybrid work machine made by combining an engine, an electric power generator motor driven by this engine to generate electric power, a battery device for accumulating the electric power, and an electric motor that is driven upon receiving the electric power generated by an electric power generator motor 19 or the electric power discharged from the battery device. More specifically, the excavator 1 rotates the upper rotation body 5 with an electric motor (hereinafter referred to as a rotation motor as necessary).

The excavator 1 includes an engine 17, a hydraulic pump 18, an electric power generator motor 19, and a rotation motor 24. The engine 17 is a power generation source for the excavator 1, and is an internal combustion engine. In the present embodiment, the engine 17 is a diesel engine. The electric power generator motor 19 is coupled with an output shaft of the engine 17. With such structure, the electric power generator motor 19 is driven by the engine 17 to generate electric power. The electric power generator motor 19 is made of, for example, a SR (switched reluctance) motor. Like the present embodiment, the electric power generator motor 19 may be directly coupled with the output shaft of the engine 17, and may be driven via transmission means such as a reduction gear connected to the output shaft of the engine 17.

The hydraulic pump 18 provides operation oil to the hydraulic device. In the present embodiment, for example, a variable capacity hydraulic pump like a swash plate hydraulic pump is used as the hydraulic pump 18. An input unit 18I of the hydraulic pump 18 is coupled with a Power transmission shaft 19S coupled with a rotor of the electric power generator motor 19. With such structure, the hydraulic pump 18 is driven by the engine 17.

A driving system 1PS includes a capacitor 22 serving as a battery device and an inverter 23 serving as a control device, which serves as an electric driving system for driving the rotation motor 24. The electric power generated by the electric power generator motor 19 or the electric power discharged from the capacitor 22 is provided via an electric power cable to the rotation motor 24, so that the upper rotation body 5 as shown in FIG. 1 is rotated. More specifically, the rotation motor 24 performs power-running operation using the electric power provided (generated) by the electric power generator motor 19 or the electric power provided (discharged) by the capacitor 22, thus rotating the upper rotation body 5. The rotation motor 24 performs regenerative operation when the upper rotation body 5 decelerates, thus providing (charging) the electric power to the capacitor 22. The electric power generator motor 19 provides (charges) the electric power, which is generated by itself, to the capacitor 22. More specifically, the capacitor 22 can also accumulate the electric power generated by the electric power generator motor 19.

The capacitor 22 is made of, for example, an electric double-layer capacitor. Instead of the capacitor 22, a nickel-metal hydride battery or a lithium ion battery may be used as a battery device. The rotation motor 24 is provided with a rotation sensor 25m. The rotation sensor 25m detects the rotation speed of the rotation motor 24. The rotation sensor 25m converts the detected rotation speed to an electric signal, and outputs it into a hybrid controller 23a provided in the inverter 23. The rotation motor 24 is made of, for example, an interior magnet synchronous electric motor. The rotation sensor 25m is made of, for example, a resolver or a rotary encoder.

In the present embodiment, the hybrid, controller 23a is a microcomputer having a calculation device such as a CPU (Central Processing Unit) and a memory (storage device). The hybrid controller 23a receives signals of detection values provided by a temperature sensor such as a thermistor or a thermocouple provided in the electric power generator motor 19, the rotation motor 24, the capacitor 22, and the inverter 23. The hybrid controller 23a manage the temperature of each device such as the capacitor 22 on the basis of the obtained temperature, and executes charge/discharge control of the capacitor 22, power generation of the electric power generator motor 19/assist control of the engine, power-running/regenerative control of the rotation motor 24.

The driving system 1PS has manipulation levers 26R, 26L provided at the right and the left positions for the position where an operator sits in the cab 6 provided in the vehicle main body 2 as shown in FIG. 1. With the manipulation levers 26R, 26L, the operator manipulates the work instrument and manipulates running operation. The work instrument and the upper rotation body are driven in response to the operation of each of them. A pilot hydraulic pressure is generated or the basis of the amounts of operations of the manipulation levers 26R, 26L. The pilot hydraulic pressure is provided to a control valve explained later. With the control valve, a spool for each work instrument is driven in response to the pilot pressure, and in accordance with the movement of the spool, the operation oil is provided to the boom cylinder 14, the arm cylinder 15, and the bucket cylinder 16. As a result, for example, in response to operation with the manipulation lever 26R to the front, the back, the right, and the left, the boom 11 operates to the upper and lower sides, and the bucket 13 performs excavating and dumping operation. On the other hand, for example, in response to operation with the manipulation lever 26L to the front and the back, the arm 12 performs excavating and dumping operation. The amounts of manipulations of the manipulation levers 26R 26L are converted into electric signals by a lever manipulation amount detection unit 27. The lever manipulation amount detection unit 27 includes a pressure sensor 27S. The pressure sensor 27S detects the pilot hydraulic pressure that is generated in response to the manipulation of the manipulation lever 26. The pressure sensor 27S outputs the voltage corresponding to the detected pilot hydraulic pressure. The lever manipulation amount detection unit 27 derives the amount of manipulation of the lever by converting the voltage that is output by the pressure sensor 27S into the amount of manipulation.

The lever manipulation amount detection unit 27 outputs the amount of manipulation of the lever to a pump controller 33 or the hybrid controller 23 as an electric signal. When the manipulation lever 26 is an electric-type lever, the lever manipulation amount detection unit 27 has an electric-type detection device such as a potentiometer. The lever manipulation amount detection unit 27 derives the amount of manipulation of the lever by converting the voltage generated by the electric-type detection device in response to the amount of manipulation of the lever. As a result, for example, in response to operation with the manipulation lever 26L to the right and the left, the rotation motor 24 is driven. On the other hand, in response to a running lever, not shown, to the right and the left, the running motor 21 is driven.

A fuel adjustment dial (hereinafter referred to as throttle dial, as necessary) 28 and a mode switching unit 29 are provided in the cab 6 as shown in FIG. 1. The throttle dial 28 sets the amount of fuel provided to the engine 17. The setting value (command value) of the throttle dial 28 is converted into an electric signal and, output to the control device (hereinafter referred to as engine controller as necessary) 30 of the engine.

The engine controller 30 obtains output values of sensors such as a rotation speed and a water temperature of the engine 17 from sensors, not shown, which are output from the engine 17. Then, the engine controller 30 finds the state of the engine 17 from the output values of the sensors obtained, and adjusts the amount of fuel injection for the engine 17, thus controlling the output of the engine 17. The engine controller 30 observes the state of the temperature, the pressure, and the like of a particulate matter removal device and a denitrating device, not shown, installed as post-processing devices of the engine 17. Then, in order to manage the particulate matter removal device and the denitrating device, the engine controller 30 outputs a command for injecting the fuel to the engine 17. In the present embodiment, the engine controller 30 has a calculation device such as a CPU and a memory (storage device).

The engine controller 30 generates a signal of a control command on the basis of the setting value of the throttle dial 28. The engine controller 30 transmits the generated control signal to a common rail control unit 32. The common rail control unit 32 receives the control signal, and adjusts the amount of fuel injection to the engine 17. More specifically, the engine 17 is an engine capable of electronic control by common rail method. The engine controller 30 appropriately controls the amount of fuel injection to the engine 17 via the common rail control unit 32, thus capable of generating the target output in the engine 17. The engine controller 30 can freely set the torque that can be output at an engine rotational speed at a certain instance.

The mode switching unit 29 is a portion for setting the work mode of the excavator 1 to a power mode or an economy mode. For example, the mode switching unit 29 is provided with a manipulation button, a switch, or a touch panel provided in the cab 6. When the operator of the excavator 1 manipulates the manipulation button and the like provided in the mode switching unit 29, and the mode switching unit 29 can switch the work mode of, the excavator 1.

Examples of work modes of the excavator 1 include the power mode and the economy mode. In the present embodiment, the power mode is a work mode in which the excavator 1 performs engine control and pump control in such a manner that the fuel-efficiency is reduced while a large amount of work is maintained. The economy models a work mode for performing engine control and pump control so as to ensure the operation speed of the work instrument 3 during light-load operation while the fuel-efficiency is still more reduced as compared with the power mode. When the work mode is set with the mode switching unit 29, the electric signal corresponding to the work mode having been set is output to the engine controller 30 and the pump controller 33.

The pump controller 33 controls the amount of flow of the operation oil discharged from the hydraulic pump 18. In the present embodiment, the pump controller 33 is a microcomputer having a calculation device, such as a CPU and a memory (storage device). The pump controller 33 receives signals transmitted from the engine controller 30, the mode switching unit 29, and the lever manipulation amount detection unit 27. Then, the pump controller 33 generates the signal of the control command for adjusting the amount of flow of the operation oil discharged from the hydraulic pump 18. The pump controller 33 uses the generated control signal to change the awash plate angle of the hydraulic pump 18, thereby changing the amount of flow of the operation oil discharged from the hydraulic pump 18.

The pump controller 33 receives a signal from the swash plate angle sensor 18a for detecting the swash plate angle of the hydraulic pump 18. The swash plate angle sensor 18a detects the swash plate angle, whereby the pump controller 33 can calculate the pump capacity of the hydraulic pump 18. A control valve 20 is provided with a pump pressure detection unit 20a for detecting the discharge pressure of the hydraulic pump 18 (hereinafter referred to as pump discharge pressure as necessary). The detected pump discharge pressure is converted into an electric signal and is input into the pump controller 33.

The engine controller 30, the Dump controller 33, and the hybrid controller 23a are connected via a vehicle LAN (Local Area Network) such as a CAN (Controller Area Network). With such structure, the engine controller 30, the pump controller 33, and the hybrid controller 23a can exchange information with each other.

In the present embodiment, at least the engine controller 30 controls the driving state of the engine 17 in this case, the engine controller 30 controls the driving state of the engine 17 using information generated by at least one of the pump controller 33 and the hybrid controller 23a. As described above, in the present embodiment, at least one of the engine controller 30, the pump controller 33, and the hybrid controller 23a functions as the control device of the internal combustion engine. More specifically, at least one of them realizes the control method of the internal combustion engine according to the present embodiment, and controls the driving state of the engine 17. In the explanation below, the engine controller 30, the pump controller 33, and the hybrid controller 23a are not distinguished from each other, these may be referred to as a machine control device.

The engine 17 has a rotation speed detection sensor 17C. The rotation speed detection sensor 17C detects the rotation speed of an output shaft 17S of the engine 17. More specifically, the rotation speed detection sensor 17C detects the number of rotations of the output shaft 17S per unit time. The engine controller 30 and the pump controller 33 obtains the rotation speed of the engine 17 detected by the rotation speed detection sensor 17C, and uses it for the control of the driving state of the engine 17. In the present embodiment, the rotation speed detection sensor 17C may detect the number of rotations of the engine 17, and the engine controller 30 and the pump controller 33 may convert the number of rotations into the rotation speed. Subsequently, the control of the engine 17 according to the present embodiment will be explained.

<Control of Engine 17>

Figure 3:
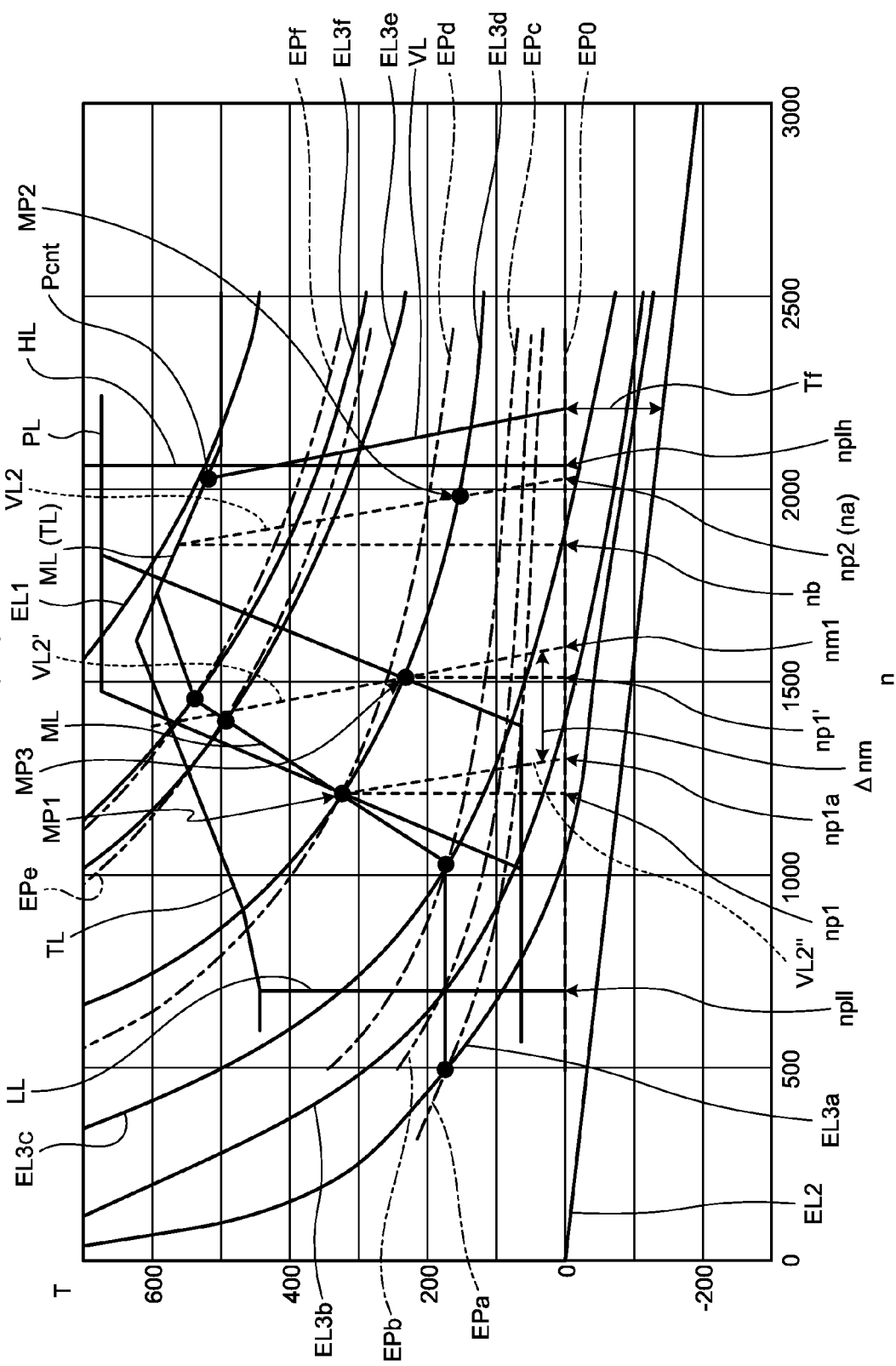
FIG. 3 is a figure illustrating an example of a torque diagram used for control of the engine according to the present embodiment.

FIG. 3 is a figure illustrating a torque diagram used for control the engine 17 accord lag to the present embodiment. The torque diagram illustrates relationship between the torque T (N×m) of the output shaft 17S of the engine 17 and the rotation speed n (rpm: rev/min) of the output shaft 17S. FIG. 3 shows equal throttle lines EL1, EL2, EL3a, EL3b, EL3c, EL3d, EL3e, EL3f, equal engine horse power lines EP0, EPa, EPb, EPc, EPd, EPe, EPf, limitation lines VL, HL, LL, the maximum torque line TL of the engine 17, a pump absorption torque line PL, and a matching route ML.

The egual throttle lines EL1, EL2, EL3a, EL3b, EL3c, EL3d, EL3e, EL3f illustrate relationship between the torque T and the rotation speed n when the fuel adjustment dial, i.e., the setting value of the throttle dial 28 the degree of opening of the throttle) is equal. The setting value of the throttle dial 28 is a command value for defining the amount of injection of fuel that the common rail control unit 32 injects to the engine 17.

In the present embodiment, the setting value of the throttle dial 28 is expressed by a percentage where the setting value of the throttle dial 28 is 0% when the amount of fuel injection for the engine 17 is zero, and the setting value of the throttle dial 28 is 100% when the amount of fuel, injection for the engine 17 is the maximum. In the present embodiment, when the machine control device controls the driving state of the engine 17, a case where the amount of fuel injection for the engine 17 is the maximum does not correspond to a case where the engine 17 makes the maximum output.

The equal throttle line EL1 corresponds to a case where the setting value of the throttle dial 28 is 100%, and more specifically, the equal throttle line EL1 corresponds to a case the amount of fuel injection for the engine 17 is the maximum. The equal throttle line EL2 corresponds to a case where the setting value of the throttle dial 28 is 0%. The equal throttle lines EL3a, EL3b, EL3c, EL3d, EL3e, EL3f correspond to values where the setting value of the throttle dial 28 are larger, in this order.

When the equal throttle lines EL1, EL2, EL3a to EL3f are compared where the rotation speed n of the engine 17 is the same, the amount of fuel injection of the equal throttle line EL1 is the maximum, and the amount of fuel injection of the equal throttle line EL2 is the minimum, i.e., zero in the equal throttle lines EL3a, EL3b, EL3c, EL3d, EL3e, EL3f, the amount of fuel injection increases in this order.

More specifically, the equal throttle line EL1 represents a first relationship between the torque T and the rotation speed n corresponding to a case where the rotation speed n of the engine 17 is the same and where the amount of fuel injection for the engine 17 is the maximum. In the explanation below, the equal throttle line EL1 will be referred to as a first equal throttle line EL1 as necessary.

The equal throttle line EL2 represents a second relationship between the torque T and the rotation speed a corresponding to a case where the rotation speed n of the engine 17 is the same and where the amount of fuel injection for the engine 17 is zero. The equal throttle line EL2 is defined such that its origin point is the point where the torque T of the engine 17 is zero and the rotation speed n is zero, and such that the torque T of the engine 17 decreases as the rotation speed n of the engine 17 increases. The ratio by which the torque T decreases based on a frictional torque Tf generated by the internal friction of the engine 17. In the explanation below, the equal throttle line EL2 will be referred to as a second equal throttle line EL2 as necessary.

The frictional torque Tf corresponds to the loss due to the internal friction of the engine 17. In the torque diagram as shown in FIG. 3, the torque which is output by the engine 17 is positive. For this reason, in the torque diagram as shown in FIG. 3, the frictional torque Tf is a negative value. The frictional torque Tf increases as the rotation speed n increases. The second equal throttle line EL2 can be derived from the relationship of the frictional torque Tf with respect to each rotation seed n of the engine 17.

The equal throttle lines EL3a, EL3b, EL3c, EL3d, EL3e, EL3f exist between the first equal throttle line EL1 and the second equal throttle line EL2. The equal throttle lines EL3a, EL3b, EL3c, EL3d, EL3e, EL3f represent a third relationship between the torque T and the rotation speed n which is obtained from the values of the first equal throttle line EL1 and the second equal throttle line EL2. In the present embodiment, the equal throttle lines EL3a, EL3b, EL3c, EL3d, EL3e, EL3f are obtained by interpolating the values of the first equal throttle line EL1 and the second equal throttle line EL2. An example of interpolation includes a linear interpolation. The method for deriving the equal throttle lines EL3a, EL3b, EL3c, EL3d, EL3e, EL3f is not limited to the interpolation.

In the explanation below, the equal throttle lines EL3a, EL3b, EL3c, EL3d, EL3e, EL3f will be referred to as third equal throttle lines EL3a, EL3b, EL3c, EL3d, EL3e, EL3f as necessary. When the plurality of third equal throttle lines EL3a, EL3b, EL3c, EL3d, EL3e, EL3f are not distinguished from each other, they will be referred to as an equal throttle line EL3 or a third equal throttle line EL3.

In the example as shown in FIG. 3, there are six third equal throttle lines EL3, but the third equal throttle line EL3 may exist between the first equal throttle line EL1 and the second equal throttle line EL3. For this reason, the number of third equal throttle lines EL3 is not limited. The interval between adjacent third equal throttle lines EL3 is not limited either.

Any one of the first equal throttle line EL1, the second equal throttle line EL2, and the third equal throttle line EL3 represent the target of the torque T and the rotation speed n of the engine 17. More specifically, the engine 17 is controlled to attain the torque T and the rotation speed n obtained from the first equal throttle line EL1, the second equal throttle line EL2, and the third equal throttle line EL3.

In the equal engine horse power lines EP0, EPa, EPb, EPc, EPd, EPe, EPf, the relationship between the torque T and the rotation speed n is defined so that the output of the engine 17 becomes constant. In the equal engine horse power lines EP0, EPa, EPb, EPc, EPd, EPe, EPf, the output of the engine 17 increases in this order. The equal engine horse power line EP0 corresponds to a case where the output of the engine 17 is zero. In the present embodiment, the equal engine horse power lines EP0, EPa, EPb, EPc, EPd, EPe, EPf correspond to a fourth relationship between the torque T and the rotation speed n. When the equal engine horse power lines EP0, EPa, EPb, EPc, EPd, EPe, EPf are not distinguished from each other, they will be referred to as an equal engine horse power line EP. The equal engine horse power line EP has a function of providing limitation so that the output of the engine 17 does not become more than the output defined by the equal engine horse power line EP.

The limitation lines VL, HL, LL limit the rotation speed n of the engine 17. More specifically, the rotation speed n of the engine 17 is controlled by the machine control device such as the engine controller 30 so as not to be more than the limitation lines VL, HL, LL. The limitation lines VL, HL define the maximum rotation speed of the engine 17. More specifically, the machine control device such as the engine controller 30 performs control so that the maximum rotation speed of the engine 17 is not more than the rotation speed defined by the limitation lines VL, HL and the engine does not rotate at an over speed. In the example as shown in FIG. 3, the engine 17 is controlled so that the rotation speed n is not more than the rotation speed np1$h$. The limitation line LL defines the minimum rotation speed of the engine 17. More specifically, the machine control device, such as the engine controller 30 performs control so that the minimum rotation speed of the engine 17 is not less than the rotation speed np11 defined by the limitation line LL.

The maximum torque line TL of the engine 17 represents the maximum output that can be generated by the engine 17 while the excavator 1 is operating as shown in FIG. 1. The torque of the engine 17 indicated by the maximum torque line TL is determined in view of the durability, exhaust smoke limit, and the like of the engine 17. For this reason, the engine 17 can generate a torque larger than the torque corresponding to the maximum torque line TL. In reality, the machine control device such as the engine controller 30 controls the engine 17 so that the torque of the engine 17 is not more than the maximum torque line TL. The pump absorption torque line PL represents the maximum torque that can be absorbed by the hydraulic pump 18 as shown in FIG. 2 with respect to the rotation speed n of the engine 17.

At the intersection point Pcnt between the limitation line VL and the maximum torque line TL, the output generated by the engine 17 is the maximum. The intersection point Pcnt is referred to as a rated point. The output of the engine 17 at the rated point Pcnt is referred to as a rated output. As described above, the maximum torque line TL is defined from the exhaust smoke limit. The limitation line VL is defined from the highest rotation speed. Therefore, the rated output is the maximum output of the engine 17 defined from the exhaust smoke limit and the highest rotation speed of the engine 17.

The matching route ML is set to pass points where the fuel consumption rate is high when the engine 17 operates at a predetermined output. In the matching route ML, the relationship between the torque T and the rotation speed n is set so that the fuel consumption rate with respect to the output of the engine 17 is the least. In the present embodiment, the matching route ML corresponds to a fifth relationship between the torque T and the rotation speed n.

Figure 4:
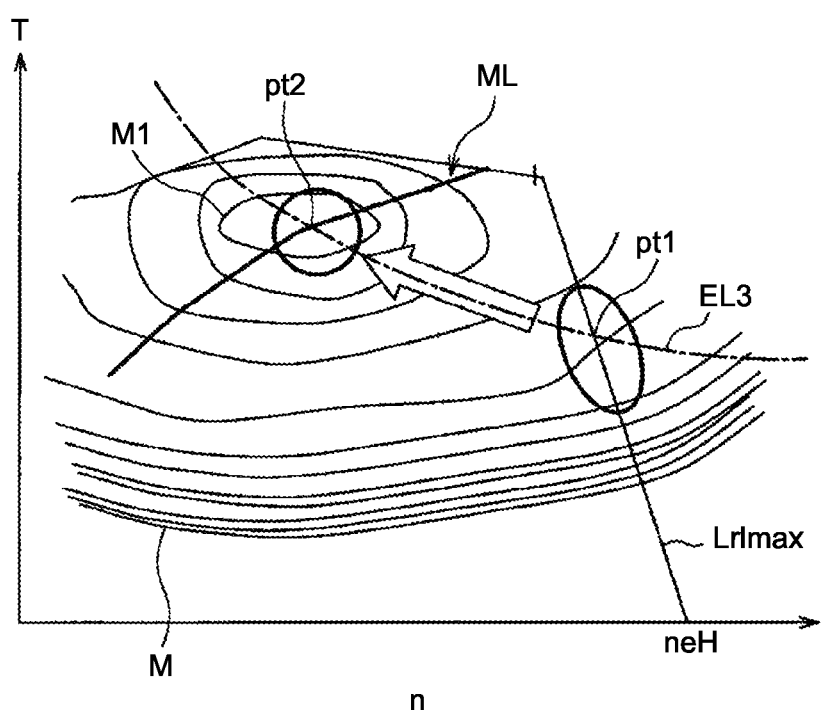
FIG. 4 is a figure for explaining a matching route.

FIG. 4 is a figure for explaining the matching route ML. The matching route ML is a line indicating the relationship between the rotation speed n and the torque T, which is obtained based on the fuel consumption rate of the engine 17. The fuel consumption rate (hereinafter referred to as fuel consumption as necessary) is the amount of fuel consumed by the engine 17 per hour and per 1 kW output. The fuel consumption rate is an index representing the efficiency of the engine 17. In the present embodiment, more specifically, the matching route ML is a line representing the relationship between the rotation speed n and the torque T, which is set to pass a fuel, consumption minimum point M1. The matching route ML preferably passes the fuel consumption minimum point M1, but due to various kinds of limitations, it may not necessarily set to pass the fuel consumption minimum point M1. For this reason, when the matching route ML is difficult to be set to pass the fuel consumption minimum point M1, it is set to pass a region close to the fuel consumption minimum point M1. In this case, the matching route ML is set to pass a region as close to the fuel consumption minimum point M1 as possible. The region as close to the fuel consumption minimum point M1 as possible may be, for example, a range enclosed by an equal fuel consumption curved line M of which fuel consumption rate is 105% to 110% of the fuel consumption rate of the fuel consumption minimum point M1.

As described, above, an equal fuel consumption curved line M at the outside farther from the fuel consumption minimum point M1 has a higher fuel consumption, i.e., a worse fuel consumption, and therefore, the matching route ML is set so as not to deviate, as much as possible, to the outside from the fuel consumption minimum point M1. In the process of deviating to the outside from the fuel consumption minimum point M1, when there are more equal fuel, consumption curved lines M crossing the matching route ML, the engine 17 may be operated in a region where the fuel consumption rate is high with a, high degree of possibility. Therefore, in the process of deviating to the outside from the fuel consumption minimum point M1, the matching route ML is set so as to reduce, as much as possible, the number of equal fuel consumption curved lines M crossing the matching route ML.

When the rotation speed n is controlled according to the matching route ML thus derived, the fuel consumption, the engine efficiency, and the pump efficiency are improved. This is because, under the condition that the engine 17 generates the same output and obtains the same amount of flow requested from the hydraulic pump 18, the engine operates as follows. In a case where the engine employs matching at a point, on the same equal throttle line EL3 and at a point pt2 on the matching route ML rather than employing matching at a point pt1 on a regulation line Lr1, the state of the engine 17 changes from the high rotation and low torque state to the low rotation and high torque state, and the pump capacity becomes high, and the engine is operated at a point close to the fuel consumption minimum point M1 on the equal fuel consumption curved line M. In addition, since the engine 17 operates in a low rotation region, the noise is reduced, and, e.g., the engine friction and the pump unload loss decrease.

In the present embodiment, the machine control device uses the first equal throttle line EL1, the second equal throttle line EL2, and the third equal throttle line EL3 obtained by Interpolating both of them, thus controlling the driving state of the engine 17. For example, the machine control device controls the engine 17 to attain the torque T and the rotation speed n at the point where the matching route ML crosses the third equal throttle line EL3 corresponding to the command value of the throttle dial 28. The machine control device can also control the engine 17 to attain the torque T and the rotation speed n at the point where the pump absorption torque line PL crosses the third equal throttle line EL3 corresponding to the setting value of the throttle dial 28. Further, the machine control device can also control the engine 17 to attain the torque T and the rotation speed n at the point where the pump absorption torque line PL, the matching route ML, and the third equal throttle line EL3 corresponding to the setting value of the throttle dial 28 cross each other.

In a case where the machine control device uses the matching route ML, to control the driving state of the engine 17, the third equal throttle line EL3 that corresponds to the matching route ML and the equal engine horse power line EP as shown in FIG. 3 is used. In a case where the machine control device controls the driving state of the engine 17 with the rotation speed n and the torque T that is out of the matching route ML, for example, the driving state of the engine 17 is controlled so as to attain the rotation speed n and the torque T on the third equal throttle line EL3 explained above. In the example as shown in FIG. 3, the machine control device controls the driving state of the engine 17 to attain the torque T and the rotation speed n on the third equal throttle line EL3$d$ that corresponds to the matching point MP1 where the equal engine horse power line EP$d$ matches the matching route ML.

When the machine control device controls the driving state of the engine 17, the engine controller 30 stores, to the storage device of itself, information about the first equal throttle line EL1, the second equal throttle line EL2, the maximum torque line TL of the engine 17, and the limitation lines VL, HL, LL. In the present embodiment, the engine controller 30 may store at least information about the first equal throttle line EL1 and the second equal throttle line EL2 to the storage device of itself. In this case, the engine controller 30 interpolates the first equal throttle line EL1 and the second equal throttle line EL2, thereby deriving the third equal throttle line EL3 corresponding to the setting value of the throttle dial 28 which has been input. Then, the engine controller 30 uses the third equal throttle line 5L3 which has been derived by interpolation to control the driving state of the engine 17. The engine controller 30 may store, to the storage device of itself, the third equal throttle line EL3 derived by interpolating the first equal throttle line EL1 and the second equal throttle line EL2.

As shown in FIG. 2, the engine controller 30 can obtain the setting value of the throttle dial 28 (signal) directly from the throttle dial 28 or via the pump controller 33. The engine controller 30 selects the third equal throttle line EL3 corresponding to the setting value of the throttle dial 28. Then, the engine controller 30 uses the selected third equal throttle line EL3 to control the driving state of the engine 17.

In the present embodiment, the engine controller 30 stores, to the storage device, the plurality of third equal throttle lines EL3 obtained by interpolating the first equal throttle line EL1 and the second equal throttle line EL2 with a predetermined interval (for example, on every 10% of the degree of opening of the throttle). When the engine controller 30 controls the engine 17, and the third equal throttle line EL3 corresponding to the setting value of the throttle dial 28 does not exist, then the engine controller 30 generates the corresponding third equal throttle line EL3 by performing interpolation using the first equal throttle line EL1 and the second equal throttle line EL2.

In this case, the engine controller 30 selects a third equal throttle line EL3 larger than the command value explained above and a third equal throttle line EL3 smaller than the setting value explained above. Then, the engine controller 30 performs the interpolation using the two third equal throttle lines EL3, thus generating the third equal throttle line EL3 corresponding to the command value explained above.

The engine controller 30 stores, to the storage device of itself, at least information about the first equal throttle line EL1, the second equal throttle line EL2, and the third equal throttle line EL3 obtained by interpolating them both, and controls the driving state of the engine 17 on the basis of the above information and the setting value of the throttle dial 28. For this reason, when the engine controller 30 receives only the setting R value of the throttle dial 28, the driving state of the engine 17 can be controlled. Therefore, by using the engine controller 30 without using any controller other than the engine controller 30, e.g., the pump controller 33 and other controllers, the engine 17 can be controlled by generating only the setting value of the throttle dial 28. As a result, the flexibility and the versatility for controlling the driving state of the engine 17 can be improved by using the engine controller 30. For example, when the performance of the engine 17 alone is to be tested, the test of the engine 17 alone can be realized by giving the setting value of the throttle dial 28 to the engine controller 30.

In some cases, the pump controller 33 or another control device provided in the excavator 1 as shown in FIG. 1 may control the engine 17 via the engine controller 30. In such case, the pump controller 33 and the like may convert the command value of the output generated by the engine 17 into the setting value of the throttle dial 28 and may give it to the engine controller 30. The setting value of the throttle dial 28 is represented as a percentage between 0% and 100%, and the setting value of the throttle dial 28 can be generated relatively easily. Therefore, another control device provided in the excavator 1 can control the engine 17 relatively easily by using the setting value of the throttle dial 28.

When another control device provided in the excavator 1 controls the engine 17 via the engine controller 30, the setting value of the throttle generated by the another control device provided in the excavator 1 is used with a higher degree of preference than the setting value which is input from the throttle dial 28 to the engine controller 30. By doing so, another control device provided in the excavator 1 can control the driving state of the engine 17. The setting value of the throttle Generated by another control device is a command value of the same type as the setting value of the throttle dial 28.

The machine control device, which is the pump controller 33 in the present embodiment, obtains information about, e.g., the amount of manipulation of the lever, the setting values of the work mode and throttle dial 28, and the turning speed of the upper rotation body 5 (turning rotation speed) (information about the driving state), and derives the command value of the output generated by the engine 17 (hereinafter referred to as engine output command value as necessary). This engine output command value is a value on the third equal throttle line EL3 as shown by the torque diagram of FIG. 3. The engine output command value is the target of the output generated by the engine 17.

The pump controller 33 converts the output command value into the degree of opening of the throttle, and outputs it to the engine controller 30. The engine controller 30 having obtained the degree of opening of the throttle from the pump controller 33 selects the third equal throttle line EL3 corresponding to the degree of opening of the throttle. Then, the engine controller 30 controls the engine 17 to attain the rotation speed n and the torque T on the selected third equal throttle line EL3.

For example, when a load is exerted on the work instrument 3 of the excavator 1 as shown in FIG. 1, the engine, controller 30 operates the work instrument 3 by causing the output of the engine 17 to match the output of the hydraulic pump 18 at the intersection point (matching point) MP1 between the third equal throttle line EL3 and the pump absorption torque line PL. The matching point MP1 is preferably on the matching route ML. The rotation speed n at the matching point MT1 is the target matching rotation speed np1. With such control, the work instrument 3 can obtain sufficient output, and at the same time, the engine 17 is driven at a low engine speed, and therefore, the fuel consumption car; be reduced to a low level.

When the load of the excavator 1 decreases as a result of a smaller load of the work instrument 3, and the amount of flow of operation oil to the hydraulic cylinders 14, 15, 16 of the work instrument 3 is required, and more specifically, when it is necessary to ensure the operation speed of the work instrument 3, then, the machine control device, which is the pump controller 33 in the present embodiment, determines a no-load maximum rotation speed np2 corresponding to information about the amount of manipulation of the lever, the turning rotation speed of the upper rotation body 5, and, the setting value of the throttle dial 28. Then, the pump controller 33 drives the engine 17 by using a variable rotation speed limitation line VL2 serving as a sixth relationship between the torque T and the rotation speed n within a range of the rotation speed between the target matching rotation speed np1 and the no-lad maximum rotation speed np2 in the present embodiment, the variable rotation speed limitation line VL2 is obtained by moving the limitation line VL. More specifically, the function of the limitation line VL is realized by moving the variable rotation speed limitation line VL2. The limitation line VL provides limitation so that the rotation speed n of the engine 17 does not become more than the rotation speed defined by the limitation line VL. Therefore, the variable rotation speed limitation line VL2 also provides limitation so that the rotation speed n of the engine 17 does not become more than the rotation speed defined by the variable rotation speed limitation line VL2.

In the present embodiment, the variable rotation speed limitation line VL2 is such that, as the rotation speed n of the engine 17 increases, the torque T of the engine 17 decreases in accordance with a linear function. The variable rotation speed limitation line VL2 passes the no-load maximum rotation speed np2 when the torque of the engine 17 is zero. The no-load maximum rotation speed np2 changes in accordance with the amount of manipulation of the lever, the turning rotation speed of the upper rotation body 5, the setting value of the throttle dial 28, and the like. For this reason, the variable rotation speed limitation line VL2 also moves in accordance with the change of the no-load maximum rotation speed np2. When the no-load minimum rotation speed nm1 explained, later is used, the variable rotation speed limitation line VL2' passes the no-load minimum rotation speed nm1, but the no-load minimum rotation speed nm1 also changes in accordance with the driving condition of the excavator 1. For this reason, the variable rotation speed limitation line VL2 moves in accordance with the change of the no-load minimum rotation speed nm1.

When the machine control device executes such control whereby the load decreases from the state in which the load is exerted on the work instrument 3, then the engine 17 changes from the operation at the matching point MP1 at the lower rotation speed side to the operation at the matching point MP2 at the higher rotation speed side. The matching point MP2 is an intersection point between the variable rotation speed limitation line VL2 and the third equal throttle line EL3$d$ that passes the matching point MP1. Since the engine 17 is driven at the matching point. MP2 at the higher rotation speed side, the hydraulic pump 18 can discharge a sufficient amount of flow of operation oil. Accordingly, the sufficient amount of flow of operation oil is provided to the hydraulic cylinders 14, 15, 16, and therefore, the operation speed of the work instrument 3 can be ensured. In addition, since the output of the engine 17 is controlled with the third equal throttle line EL3$d$ being the target, the engine 17 does not consume energy uselessly. It should be noted that the no-load maximum rotation speed np2 is not limited to the maximum engine speed that can be output by the engine.

When the load of the work instrument 3 further decreases, and the machine control device keeps on driving the engine 17 at a region of a high rotation speed, then much fuel is consumed. As a result, the fuel consumption may deteriorate. Therefore, when the load decreases, and when, for example, just like the operation with only the bucket 13, it is not necessary to have a high amount of flow of the operation nil discharged from the hydraulic pump 18 and it is not necessary to have a high discharge pressure, and more specifically, when the pump capacity is a sufficient margin, then the machine control device shifts the variable rotation speed limitation line VL2 to a region of a low rotation speed.

As described above, the pump capacity is detected by the swash plate angle sensor 18$a$. The machine control device, which is the pump controller 33 in the present embodiment, shifts the variable rotation speed limitation line VL2 in accordance with the magnitude of the detection value of the awash plate angle sensor 18$a$. For example, when it is detected that the pump capacity is more than a predetermined value, the hydraulic devices such as the hydraulic cylinders 14, 15, 16 require the amount of flow of the operation oil. In this case, the pump controller 33 shifts the variable rotation speed limitation line VL2 to a region of a high rotation speed to increase the rotation speed n of the engine 17. When it is detected that the pump capacity is less than a predetermined value, the hydraulic devices do not require the amount of flow of the operation oil. In this case, the pump controller 33 shifts the variable rotation speed limitation line VL2 to a region of a low rotation speed to decrease the rotation speed n of the engine 17. By executing such control, the machine control device can suppress useless fuel consumption when the engine operates in the region of the high rotation speed.

In the present embodiment, when another control device such as the pump controller 33 generates the output command value of the engine 17 and controls the engine 17 using this, the pump controller 33 converts the output command value into the setting value of the throttle and gives it to the engine controller 30. The engine controller 30 controls the driving state of the engine 17 by using the third equal throttle line EL3 corresponding to the setting value of the throttle that has been converted. More specifically, the machine control device control the engine 17 by using the third equal throttle line EL3 that matches the matching route ML and the equal engine horse power line EP corresponding to the output command value. By doing so, the third equal throttle line EL3 corresponding to the output command value can be selected.

In many cases, the machine control device controls the engine 17 on the matching route ML where the fuel consumption of the engine 17 is good. As shown in FIG. 3, the shapes of the equal engine horse power line EP and the third equal throttle line EL3 are different, the third equal throttle line EL3 and the equal engine horse power line EP corresponding to the output command value are matched on the matching route ML, and therefore, on the matching route ML which is often used, the third equal throttle line EL3 and the output command value can be the same. As a result, this can reduce the difference of actual operation of the excavator 1 and the output command value, and therefore, this can suppress the reduction of the maneuverability of the excavator 1.

In the present embodiment, the first equal throttle line EL1 is the equal engine horse power line of the engine 17, i.e., a line indicating that the output of the engine 17 is constant. In the first equal throttle line EL1, the output at the rotation speed to generate the rated output of the engine 17 is equal to or more than the rated output. In the present embodiment, the first equal throttle line EL1 is the equal engine horse power line but is not limited thereto.

The second equal throttle line EL2 is such that, as the rotation speed n of the engine 17 increases, the torque T decreases in accordance with a linear function. The third equal throttle line EL3 is obtained by interpolating the first equal throttle line EL1 and the second equal throttle line EL2. For this reason, the equal engine horse power line EP and the third equal throttle line EL3 corresponding to the horse power of the equal engine horse power line EP cross each other at a point. For example, the equal, engine horse power line EP corresponding to the half of the maximum output of the engine 17 corresponds to the third equal throttle line EL3 corresponding to the case where the degree of opening of the throttle is 50%, but both of them cross each other at a point.

In the present embodiment, on the matching route ML, the equal engine horse power line EP and the third equal throttle line EL3 are caused to be the same. When the rotation speed n of the engine 17 is more than the matching route ML, the third equal throttle line EL3 is more than the equal engine horse power line EP when compared at the same rotation speed n. When the rotation speed n of the engine 17 is less than the matching route ML, the equal engine horse power line EP is more than the third equal throttle line EL3 when compared at the same rotation speed n. In the present embodiment, as described above, when the load is exerted on the work instrument 3 of the excavator 1 and thereafter the load decreases, the machine control device controls the engine 17 at the matching point MP2 between the third equal throttle line EL3d and the variable rotation speed limitation line VL2 based on the no-load maximum rotation speed np2.

At the rotation speed np2 of the matching point MP2, the torque T is smaller on the third equal throttle line EL3d corresponding to the equal engine horse power line EPd than the equal engine horse power line Epd, and therefore, the fuel consumption of the engine 17 is improved. When the amount of flow of the operation oil is required, the torque for driving the hydraulic pump 18 may be relatively smaller. For this reason, when the amount of flow of the operation oil is required, the fuel consumption of the engine 17 can be improved by controlling the engine 17 by using the third equal throttle line EL3d. In the present embodiment, the relationship between the third equal throttle line EL3 and the equal engine horse power line EP is the relationship explained above, and therefore, when the load for the work instrument 3 decreases and thereafter the amount of flow of the hydraulic pump 18 is required, it is preferable to improve the fuel consumption of the engine 17 while ensuring the amount of flow of the operation oil.

When the rotation speed n of the engine 17 is relatively snail, a pressure higher than the amount of flow of the operation oil is required. Therefore, a large torque T is required to drive the hydraulic pump 18. In the present embodiment, the relationship between the third equal throttle line EL3 and the equal engine horse power line EP is the relationship as described above. For this reason, in the present embodiment, when the rotation speed n of the engine 17 is low, and more specifically, in a region where the rotation speed is lower than the matching route ML and the torque is high, the torque T is larger on the third equal throttle line EL3d corresponding to the equal engine horse power line EPd than the equal engine horse power line EPd when compared at the seine to speed n. When a high pressure is required for the operation oil, a larger torque T can be generated by using the third equal throttle line EL3d corresponding to the equal engine horse power line EPd rather than using the equal engine horse power line EPd, and this is more preferable.

As shown in FIG. 3, the torque T is higher on the first equal throttle line EL1 than on the maximum torque line TL of the engine 17 at each rotation speed n of the engine 17. When there is a delay of communication with another control device and the environment where the engine 17 is used chances, the machine control device performs as described above, thus capable of reducing the chance that the output of the engine 17 becomes more than the value defined by the maximum torque line TL. As a result, the engine 17 is less likely to be used with an overload, and this is preferable.

The variable rotation speed limitation line VL2 is derived from the rotation speed at the intersection point with the horizontal axis (torque T=0) of the torque diagram as shown in FIG. 3 and the rotation speed at the intersection point with the maximum torque line TL. The rotation speed at the point where the variable rotation speed limitation line VL2 crosses the horizontal axis of the torque diagram is denoted as na, and the rotation speed at the point where the variable rotation speed limitation line VL2 crosses the maximum torque line TL is denoted as nb. At this occasion, the variable rotation speed limitation line VL2 is determined so that na=k×nb holds k is a constant larger than 1. k is set in advance. The no-load maximum rotation speed opt is explained as an example. When the rotation speed at the point where the variable rotation speed limitation line VL2 crosses the maximum torque line TL is denoted as np2', the variable rotation speed limitation line VL2 is determined so that the no-load maximum rotation speed np2=k×np2' holds.

The variable rotation speed limitation line VL2 is expressed as a numerical expression T=h1×n+i, and the maximum torque line TL of a portion crossing the variable rotation speed limitation line VL2 is expressed as a numerical expression T=h2×n+j. h1, h2, j are constants. In this case, the inclination h1 of the variable rotation speed limitation line VL2 is (h2×na+k×j)×(1−k)/(k²×na), and the constant i can be derived from −h1×na. Since k, h2 and j are already known, h1 and i can be derived when the rotation speed na is given. For example, when the rotation speed na is the no-load maximum rotation speed np2, h1 and i corresponding thereto are derived. For example, the engine controller 30 stores the numerical expression for deriving h1 and i to the storage device of itself. Then, for example, h1 and i are derived on the basis of the rotation speed na given from the pump controller 33 and the like, and the variable rotation speed limitation line VL2 is generated. Then, the engine controller 30 controls the engine 17 by using the generated variable rotation speed limitation line VL2.

As can be understood from FIG. 3 and the numerical expression explained above, the variable rotation speed limitation line VL2 can be expressed as a function of a linear function where the inclination is h1 and the intercept is i. The variable rotation speed limitation line VL2 has the inclination h1, and therefore, there is an advantage in that it is easy to match with the third equal throttle line EL3. It should be noted that the inclination h1 of the variable rotation speed limitation line. VL2 may be changed in accordance with the rotation speed n. In this case, the engine 17 can be controlled more precisely. Subsequently, the control of the engine 17 will be explained in detail.

<Details of Control of Engine 17>

Figure 5:
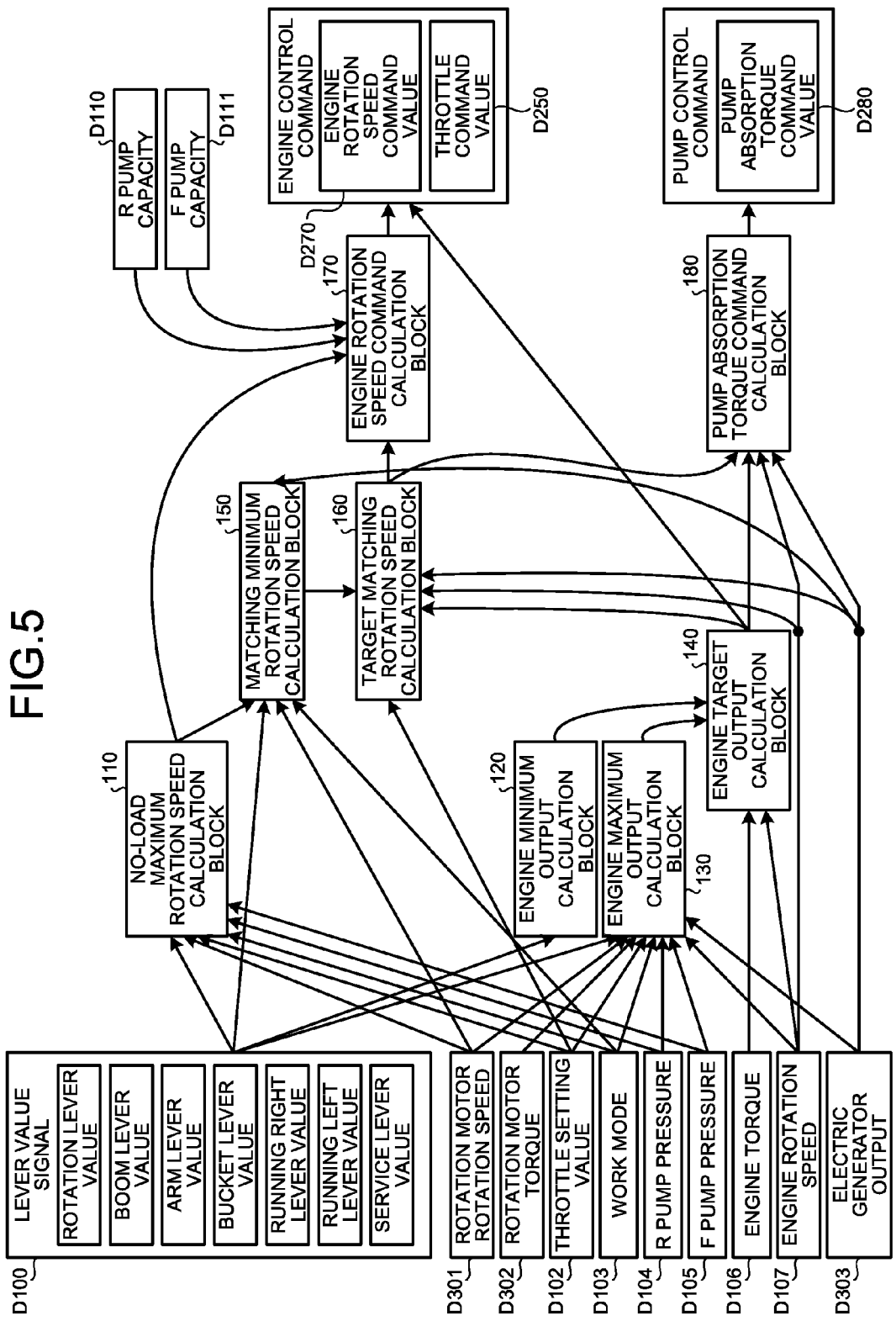
FIG. 5 is a figure illustrating a control flow of the engine.
Figure 6:
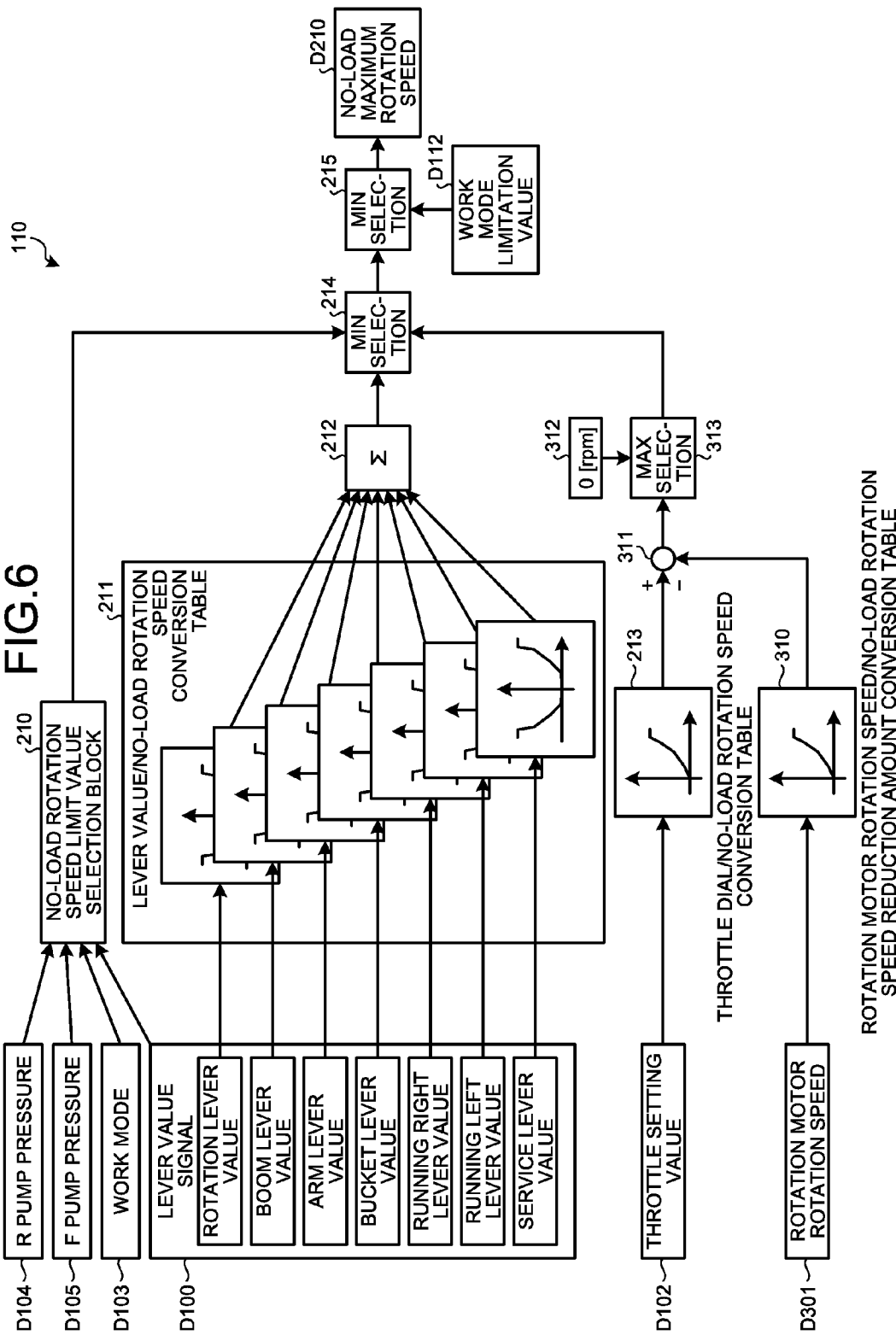
FIG. 6 is a figure illustrating no-load maximum rotation speed calculation block.

FIG. 5 is a figure illustrating a control flow of the engine 17. FIG. 6 is a figure illustrating a no-load maximum rotation speed calculation block 110. At least one of the engine controller 30 and the pump controller 33 serving as a machine control device derives the engine rotation speed command value and the engine output command value serving as an engine control command, and derives the pump absorption torque command value serving as the pump control command in the present embodiment, in the present embodiment, the engine controller 30 obtains the engine rotation speed command value D270 and the throttle command value (the command value of the degree of opening of the throttle) D250, and controls the driving state of the engine 17 on the basis of the above. The throttle command value D250 corresponds to the command value that is the same type as the setting value of the throttle dial 28 (command value), which is generated by the control device other than the engine controller 30 provided in the excavator 1. A control device other than the engine controller 30 provided in the excavator 1 is, for example, the pump controller 33 or the hybrid controller 23a.

In the control of the engine 17, a lever value signal D100, a throttle setting value D102, a work mode D103, an R pump pressure D104, an F pump pressure D105, an engine torque D106, an engine rotation speed D107, a rotation motor rotation speed D301 which is rotation speed of the rotation motor 24, a rotation motor torque D302 which is torque of the rotation motor 24, and an electric generator output D303 which is output of an electric power generator motor 19 are used as input parameters. The rotation motor rotation speed. D301 is input into the no load maximum rotation speed calculation block 110, an engine maximum output calculation block 130, and a matching minimum rotation speed calculation block 150. The rotation motor torque D302 is input into the engine maximum output calculation block 130. The electric generator output D303 is input into the engine maximum output calculation block 130, the matching minimum rotation speed calculation block. 150, a target matching rotation speed calculation block 160, and a pump absorption torque command value calculation block 180.

In the control flow as shown in FIG. 5, the no-load maximum rotation speed calculation block 110 calculates the no-load maximum rotation speed D210 (np2) which is the value that becomes the upper limit value of the engine rotation speed command value. When the pump capacity of the hydraulic pump 18 is the maximum, the amount of flow of the hydraulic pump 18 (the amount of flow of discharge from the hydraulic pump) is a product of the engine rotation speed and the pump capacity. The amount of flow of discharge from the hydraulic pump is in proportional to the rotation speed n of the engine 17, the no-load maximum rotation speed D210 and the maximum amount of flow of the hydraulic pump 18 (pump maximum discharge amount) are in proportional relationship. For this reason, first, in the no-load maximum rotation speed calculation block 110, a summation unit 212 derives, as a candidate value of the no-load maximum rotation speed D210, a summation of the no-load rotation speed derived by each lever value signal D100 (the amount of manipulation of the lever).

The lever value signals D100 (signals indicating the amount of manipulation of each lever) includes a rotation lever value, a boom lever value, an arm lever value, a bucket lever value, a running right lever value, a running left lever value, and a service lever value. The service lever value is a value indicating the amount of manipulation of the lever with which the hydraulic actuator is operated, in a case where the hydraulic circuit capable of being connected to a new hydraulic actuator is provided. Each lever value signal is converted into the no-load rotation speed by a lever value/no-load rotation speed conversion table 211 as shown in FIG. 6. The no-load rotation speed of the summation derived from the values thus converted by the summation unit 212 is output to a first minimum value selection unit (MIN selection) 214. In the present embodiment, the function of the no-load maximum rotation speed calculation block 110 is achieved with the pump controller 33.

A no-load rotation speed limit value selection block 210 as shown in FIG. 6 uses four pieces of information, i.e., the amount of manipulation of each lever value signal D100, the pump pressures D104, D105 which are discharge pressures of the hydraulic pumps 18, and the work mode D103 set by the mode switching unit 29, thus determining what kind of operation pattern (work pattern) is currently executed by the operator of the excavator 1. On the basis of the determination result, the no-load rotation speed limit value selection block 210 selects and determines the no-load rotation speed limit value for the operation pattern that is set in advance.

The no-load rotation speed limit value thus determined is output to the first minimum value selection unit 214. The determination of the operation pattern (work pattern) will be explained. For example, when the arm lever is manipulated in the digging direction and the pressure (pump pressure) of the operation oil discharged by the hydraulic pump 18 (pump pressure) is higher than the predetermined setting value, then the no-load rotation speed limit value selection block 210 determines that the excavator 1 is executing heavy digging work. In complex operation, e.g., when the rotation lever is pushed to a side and the boom lever is manipulated in the upward direction, the no-load rotation speed limit value selection block 210 determines that the excavator 1 is executing hoist rotation work. As described above, the determination of the operation pattern (work pattern) is estimation in which the no-load rotation speed limit value selection block 210 estimates the operation that the operator is trying to execute. It should be noted that the hoist rotation work is such work in which the excavator 1 digs the soil with the bucket 13 and thereafter rotates the upper rotation body 5 while raising the boom 11, and then the excavator discharges the soil in the bucket 13 at a desired stop position.

The no-load maximum rotation speed calculation block 110 determines the candidate value of the no-load maximum rotation speed also from the setting state of the throttle dial 28 as shown in FIG. 2 (throttle setting value D102). More specifically, the no-load maximum rotation speed calculation block 110 having received the signal corresponding to the throttle setting value D102 uses a throttle dial/no-load rotation speed conversion table 213 to convert the throttle setting value D102 into the candidate value of the no-load maximum rotation speed. Then, the no-load maximum rotation speed calculation block 110 outputs the candidate value of the no-load maximum rotation speed to the first minimum value selection unit 214.

The first minimum value selection unit 214 selects the minimum value from among the three values, i.e., the no-load rotation speed derived from the lever value signal D100, the no-load rotation speed limit value derived by the no-load rotation speed limit value selection block 210, and the no-load rotation speed derived from the throttle setting value D102. The value selected by the first minimum value selection unit 214 is output to a second minimum value selection unit (MIN selection) 215. The second minimum value selection unit 215 compares the value selected by the first minimum value selection unit 214 and the work mode limitation value D112 of the excavator 1. As a result of the comparison, the second minimum value selection unit 215 outputs the minimum value of them both as the no-load maximum rotation speed D210 (np2). The work mode limitation value D112 is the upper limit value of the rotation speed n of the engine 17 determined according to the driving mode of the excavator 1. The work mode limitation value D112 is larger when the work mode is the power mode than when the work mode is the economy mode.

The hybrid excavator 1 having the rotation motor 24 driven by electricity does not require hydraulic pressure as the driving source for rotating the upper rotation, body 5. For this reason, the amount of flow of the operation oil discharged from the hydraulic pump 18 for driving the rotation may be subtracted from the operation oil discharged from the hydraulic pump 18. A subtraction unit 311 subtracts the no-load rotation speed reduction amount derived by a rotation motor rotation speed/no-load rotation speed reduction amount conversion table 310 on the basis of the rotation motor rotation speed D301 from the no-load rotation speed derived by the throttle dial/no-load rotation speed conversion table 213 on the basis of the throttle setting value D102. The rotation speed that is output by the subtraction unit 311 is adopted as the candidate value of the no-load maximum rotation speed D210. A maximum value selection unit (MAX selection) 313 performs maximum value selection for selecting one of a zero value 312 and the rotation speed which is output by the subtraction unit 313. With such processing, a negative value can be prevented from being given to a minimum value selection unit 314.

Figure 7:
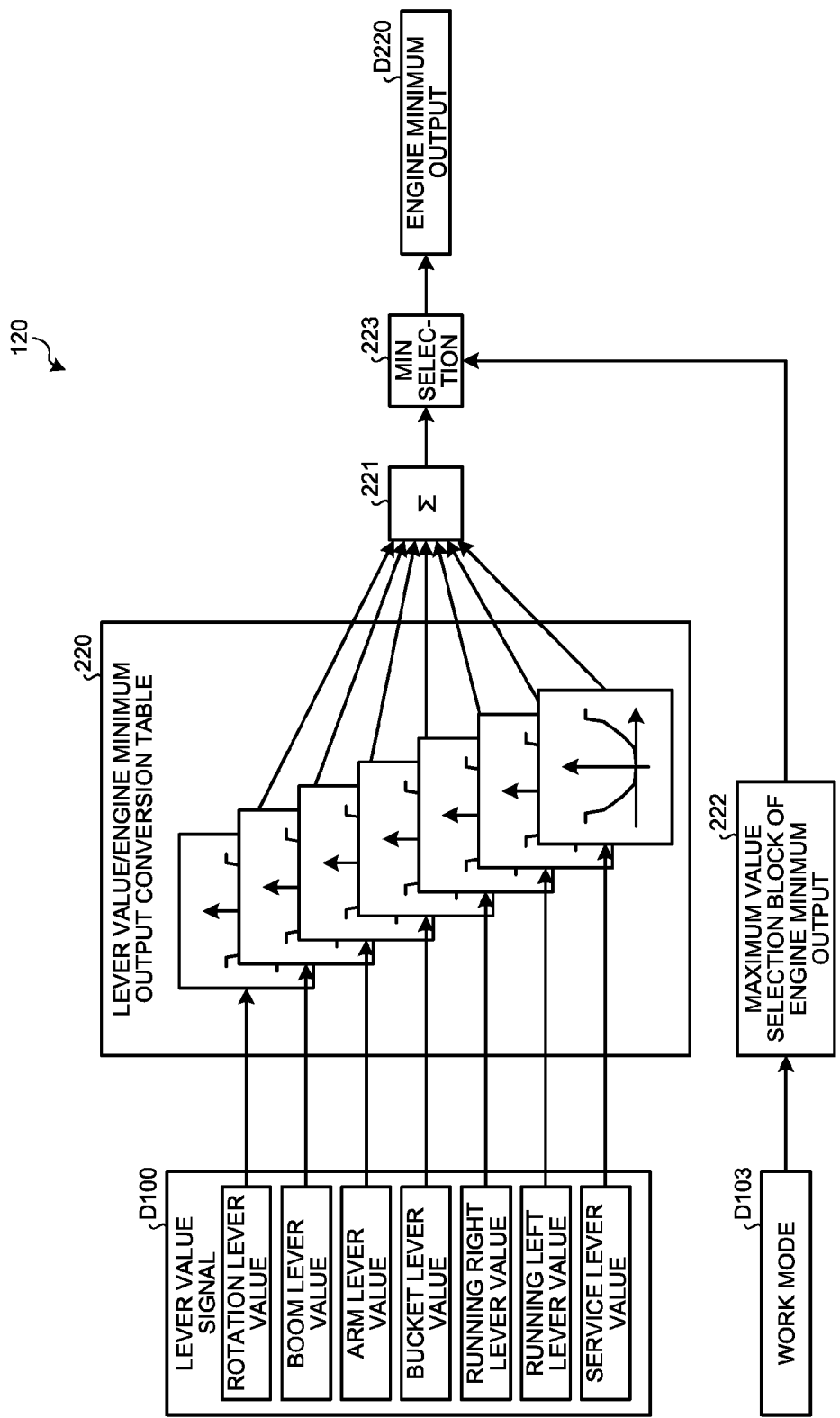
FIG. 7 is a figure illustrating a control flow of an engine minimum output calculation block.

FIG. 7 is a figure illustrating a control flow of an engine minimum output calculation block 120. As shown in FIG. 7, the engine minimum output calculation block 120 calculates the engine minimum output D220 which is the value that becomes the lower limit of the engine output command value. Like the calculation of the no-load maximum rotation speed D210, a lever value/engine minimum output conversion table 220 converts each lever value signal D100 into the engine minimum output, and a summation unit 221 outputs the summation thereof to a minimum value selection unit (MIN selection) 223.

A maximum value selection block 222 of the engine minimum output outputs, to a minimum value selection unit 223, the upper limit value corresponding to the work mode D103 that is set by the mode switching unit 29. The minimum value selection unit 223 compares the summation of the engine minimum output corresponding to each lever value signal D100 and the upper limit value corresponding to the work mode D103, and selects the minimum value and outputs it as the engine minimum output D220. In the present embodiment, the function or the engine minimum output calculation block 120 is achieved by the pump controller 33.

Figure 8:
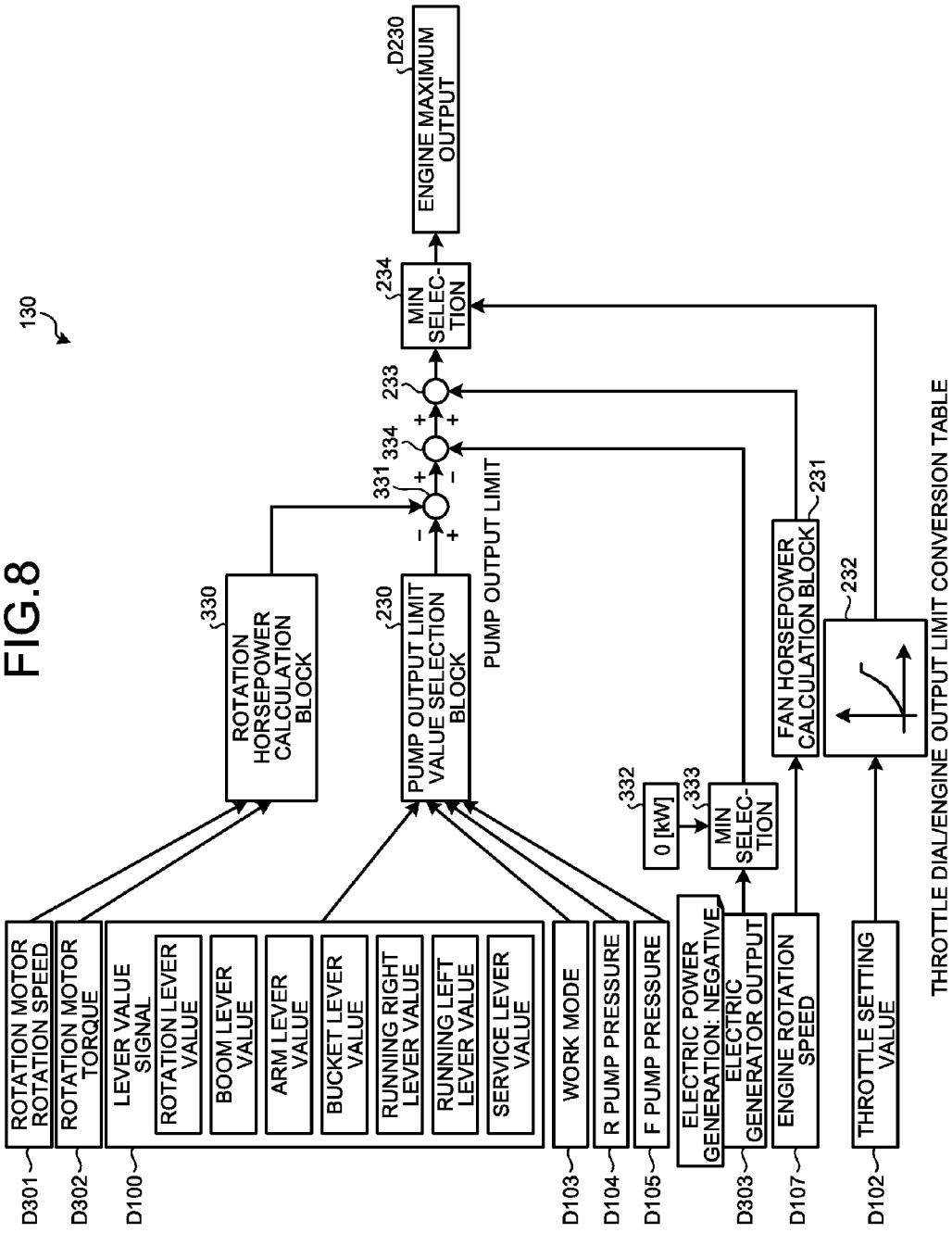
FIG. 8 is a figure illustrating a control flow of an engine maximum output calculation block.

FIG. 8 is a figure illustrating a control flow of the engine maximum output calculation block 130. As shown in FIG. 8, the engine maximum output calculation block 130 calculates the engine maximum output D230 which is the value that becomes the upper limit of the engine output command value. The engine maximum value output calculation block 130 uses the rotation motor rotation speed D301 and the rotation motor torque D302 as input parameters. Then, a rotation, horsepower calculation block 330 calculates the rotation horsepower, and using the engine speed of the engine D107, a fan horsepower calculation block 231 calculates the fan horsepower. The rotation horsepower and the fan horsepower are added to the pump output limit value via, a subtraction unit 331 and an adding unit 233, respectively. The electric generator output D303 of the electric power generator motor 19 is added to the pump output limit value via a subtraction unit 334.

Like the calculation of the no-load maximum rotation speed calculation block 110, a pump output limit value selection block 230 uses information about the setting values of the work mode D103 and the pump pressures D104, D105 and the amount of manipulation of each lever value signal D100 to determine the current operation pattern, and selects the pump output limit value for each operation pattern.

As shown in FIG. 8, addition to the pump output limit value of the electric generator output D303 and the rotation horsepower is subtraction (see subtraction units 331, 334). The hybrid excavator 1 uses the rotation motor 24 driven by electricity, which is different from the power generation source, i.e., the engine 17. For this reason, it is necessary to derive the rotation horsepower of the rotation motor 24 and subtract the horsepower corresponding to the rotation from the pump output limit value. When the electric power generator motor 19 generates electric power, the electric Generator output D303 defines the positive/negative sign of the value as negative. A minimum value selection unit 333 compares the electric generator output D303 and a zero value 332, and subtracts the negative value from the pump output limit value, and therefore, this is substantially addition.

When the electric power generator motor 19 assists the output of the engine 17, the positive/negative of the value of the electric generator output D303 is positive. When the electric power generator motor 19 generates electric power, the value of the electric generator output D303 is negative. The minimum value selection unit (MIN selection) 333 performs minimum value selection for selecting one of the electric generator output D303 and the zero value 332. The subtraction unit 334 subtracts the negative electric generator output from the pump output limit. More specifically, the subtraction unit 334 substantially adds the electric generator output D303 to the pump output limit. More specifically, only when the electric generator output D303 is a negative value, addition is performed.

The engine 17 is assisted by the electric power generator motor 19 in order to enhance the responsiveness of the work instrument 3 when the engine rotation speed D107 needs to increase from a certain predetermined rotation speed to a higher rotation speed. When the output for the assist of the engine 1 is removed as the engine output at this occasion, the responsiveness of the work instrument 3 cannot be improved. For this reason, in the present embodiment, when the engine 17 is assisted, the engine maximum output is not reduced. More specifically, even when the positive electric generator output D303 is input into the minimum value selection unit 333, the minimum value selection unit 333 outputs zero due to the minimum value selection in which selection is made with the zero value 332. As a result, the engine maximum output D230 is derived without subtraction from the pump output limit.

The adding unit 233 adds the fan horsepower calculated by the fan horsepower calculation block 231 from the current engine rotation speed D107 to the value that is output by the subtraction unit 334. The engine rotation speed D107 is detected by the rotation speed detection sensor 17C as shown in FIG. 2. The value added by the adding unit 233 (hereinafter referred to as added value) and the engine output limit, value are output to a minimum value selection unit (MIN selection) 234. The engine output limit value is derived through conversion with a throttle dial/engine output limit conversion table 232 in accordance with the throttle setting value D102.

The minimum value selection unit 234 selects the minimum value of the added value and the engine output limit value, and outputs it as the engine maximum output D230. It should be noted that a fan is provided in proximity to a radiator for cooling the engine 17. The fan blows air to the radiator. The fan is rotated and driven in synchronization with the drive of the engine 17. It should be noted that the rotation horsepower can be derived by an expression (1). The coefficient in the expression (1) is the setting value. The fan horsepower can be derived from an expression (2). In the present embodiment, the function of the engine maximum output calculation block 130 can be achieved with the pump controller 33.

$$\text{rotation horsepower (kW)} = 2\pi/60 \times \text{rotation motor rotation speed} \times \text{rotation motor torque}/1000 \times \text{coefficient} \qquad (1)$$

$$\text{fan horsepower} = \text{fan rated horsepower} \times (\text{engine speed of the engine}/\text{engine speed of the engine at fan rating})^3 \qquad (2)$$

Figure 9:
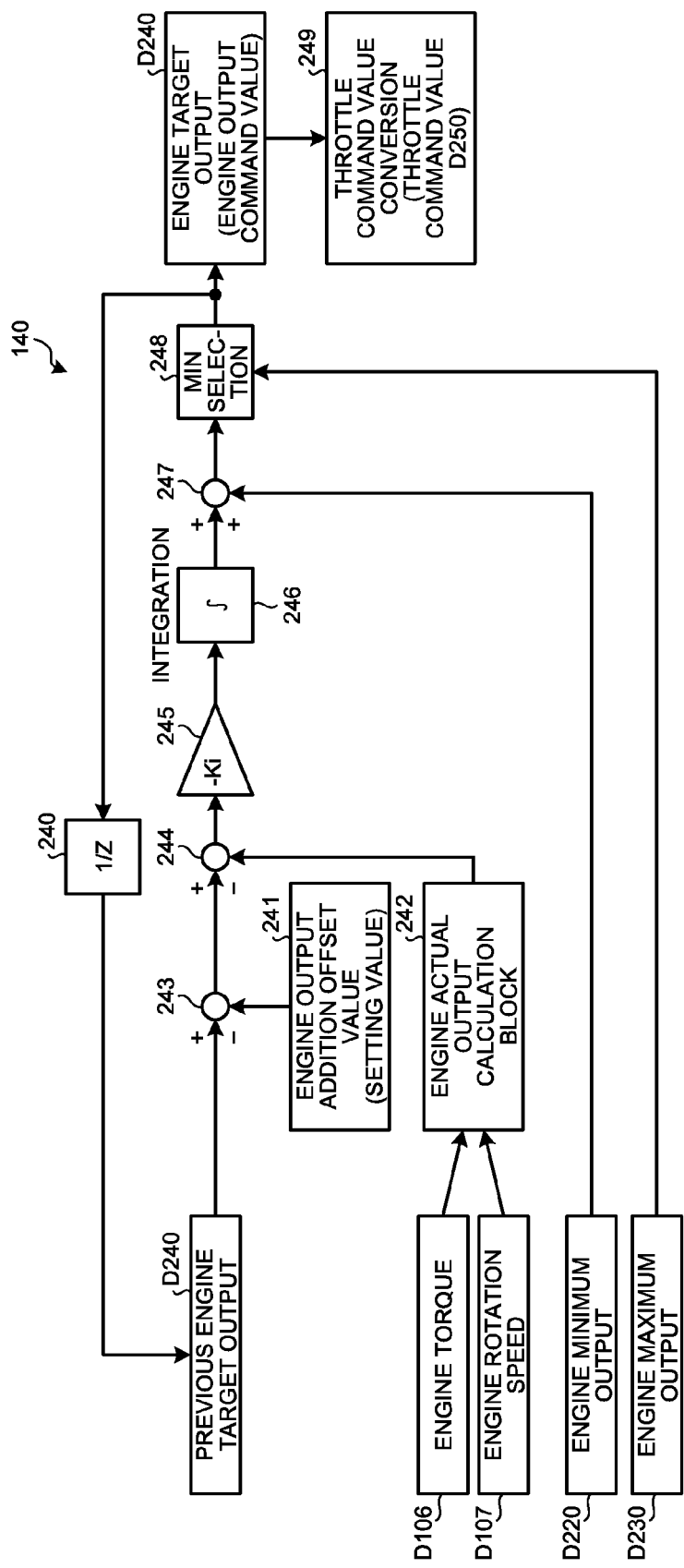
FIG. 9 is a figure illustrating a control flow of an engine target output calculation block.

FIG. 9 is a figure illustrating a control, flow of an engine target output calculation block 140. As shown in FIG. 9, the engine target output calculation block 140 calculates the engine target output D240. A subtraction unit 243 subtracts an engine output addition offset value 241, which is set as the fixed value, from the previous engine target output D240 derived in the previous calculation. A subtraction unit 244 derives a deviation that is obtained by subtracting the engine actual output calculated by an, engine actual output calculation block 242 from the value obtained through the subtraction with the subtraction unit 243.

A multiplying unit 245 calculates the value obtained by multiplying the deviation calculated by a subtraction unit 244 by a predetermined gain (−Ki). An integration unit 246 integrates the multiplied values calculated by the multiplying unit 245. An adding unit 247 adds the engine minimum output D220 derived through calculation by the engine minimum output calculation block 120 to the integration value integrated by the integration unit 246. A minimum value selection unit (MIN selection) 248 outputs, as the engine target output D240 to a throttle command value conversion unit 249, the minimum value which is one of the added value derived by the adding unit 247 and the engine maximum output D230 derived through calculation by the engine maximum output calculation block 130.

The engine target output D240 means the equal engine horse power line EP as shown in FIG. 3. The engine actual output calculation block 242 derives the engine actual output from the expression (2) on the basis of the amount of fuel injection commanded by the engine controller 30, the engine torque 2106 predicted from the rotation speed of the engine 17, atmospheric temperature and the like, and the current engine rotation speed D107 of the engine 17 detected by the rotation speed detection sensor 17C as shown in FIG. 2.

$$\text{engine actual output (kW)}=2\times\pi/60\times\text{actual rotation speed}\times\text{engine torque}/1000 \quad (2)$$

The throttle command value conversion unit 249 converts the engine target output D240 into the throttle command value D250 as necessary. As shown in FIG. 5, the throttle command value D250 is used as the engine control command. The throttle command value D250 corresponds to the third equal throttle line EL3 as shown in FIG. 3. The throttle command value conversion unit 249 employs, as the throttle command value D250, the third equal throttle Line EL3 matching the point where the equal engine horse power line EP corresponding to the engine target output D240 crosses the matching route ML as shown in FIG. 3. The engine controller 30 controls the driving state of the engine 17 in accordance with the third equal throttle line EL3 corresponding to the throttle command value 2250. In the present embodiment, the function of the engine target output calculation block 140 is achieved with the pump controller 33.

Figure 10:
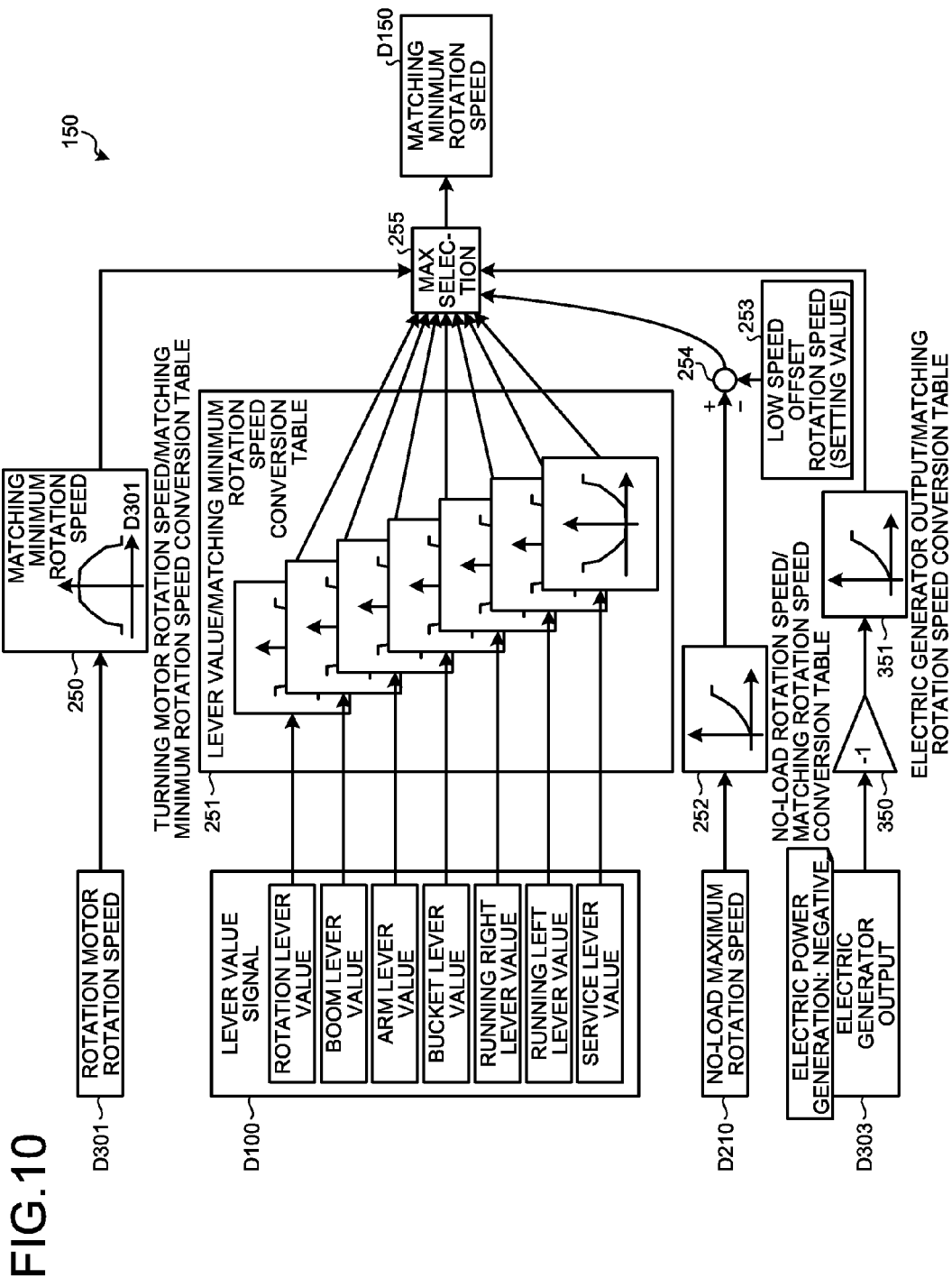
FIG. 10 is a figure illustrating a control flow of a matching minimum rotation speed calculation block.

FIG. 10 is a figure illustrating a control flow of the matching minimum rotation speed calculation block 150. As shown in FIG. 10, the matching minimum rotation speed calculation block 150 calculates the matching minimum rotation speed D150 which is the engine speed of the engine which is to be at least attained when the excavator 1 is working. The value into which a lever value/matching minimum rotation speed conversion, table 251 converts the lever value signals D100 can be the candidate values of the matching minimum rotation speed D150. The candidate values are output to a maximum value selection unit (MAX selection) 255.

A no-load rotation speed/matching rotation speed conversion table 252 adopts the rotation speed of the engine 17 at the intersection point between the variable rotation speed limitation line VL2 and the matching route ML as the matching rotation speed np2', and converts and outputs the no-load maximum rotation speed D210 (np2) derived by the no-load maximum rotation speed calculation block 110. A subtraction unit 254 subtracts a low speed offset rotation speed 253 from the matching rotation speed np2'. The subtraction unit 254 outputs the value obtained as the result of subtraction to the maximum value selection unit (MAX selection) 255 as the candidate value of the matching minimum rotation speed D150.

The limitation value (electric generator maximum torque) of the torque that can be output, by the electric power generator motor 19 is set. For this reason, it is necessary to increase the engine rotation speed D107 so that the electric power generator motor 19 generates electric power with a certain large level of output. Using an electric generator output/matching rotation speed conversion table 351, the matching minimum rotation speed calculation block 150 derives the engine rotation speed D107, which is at least attained, from the magnitude of the electric generator output D303 required at all times. Then, the matching minimum rotation speed calculation block 150 outputs the derived engine rotation speed to the maximum value selection unit (MAX selection) 255 as the candidate value of the matching minimum rotation speed D150. Since the electric generator output D303 is negative, a gate 350 provided at a stage after the electric generator output D303 is provided to convert the electric generator output. D303 into a positive value.

A turning rotation speed/matching minimum rotation speed conversion table 250 converts the turning rotation speed D101 as the candidate value of the matching minimum rotation speed D150, and then outputs it to the maximum value selection unit 255. The turning rotation speed D101 is a value obtained by detecting the turning rotation speed of a rotation hydraulic motor 31 of FIG. 2 using the rotation sensor such as a resolver, a rotary encoder, or the Like. The turning rotation speed/matching minimum rotation speed conversion table 250 converts the turning rotation speed D101 into the matching minimum rotation speed with such property that, when the turning rotation speed D101 is zero, the matching minimum rotation speed is increased, and as the turning rotation speed 3101 increases, the matching minimum rotation speed is reduced. The maximum value selection unit 255 selects the maximum value from the matching minimum rotation speeds and the candidate values of the matching minimum rotation speed D150 which are output from the subtraction unit 254 and the electric generator output/matching rotation speed conversion table 351, and outputs it as the matching minimum rotation speed D150.

In the present embodiment, when the load of the work instrument 3 decreases, the rotation speed n of the engine 17 increases to a speed as high as the no-load maximum rotation speed np2. When a sufficient load is exerted on the work instrument 3, the rotation speed of the engine 17 decreases to a speed as low as the target matching rotation speed np1. In this case, the rotation speed n of the engine 17 greatly changes in accordance with the magnitude of the load exerted on the work instrument 3. The great change of the rotation speed n of the engine 17 may make the operator of the excavator 1 feel uncomfortable as if the excavator 1 is not generating sufficient power.

For this reason, in the present, embodiment, the low speed offset rotation speed is used, and in accordance with the magnitude of the low speed offset rotation speed, the width of the change of the rotation speed n of the engine 17 is changed, so that the uncomfortable feeling can be reduced. More specifically, when the low speed offset rotation speed is small, the width of the change of the rotation speed n of the engine 17 is small, and when the low speed offset rotation speed is large, the width of the change of the rotation speed n of the engine 17 is large. In accordance with the operation state of the excavator 1 such as the state in which the upper rotation body 5 is rotating or the state in which the work instrument 3 is performing digging work, the uncomfortable feeling of the operator is different even when the width of the change of the rotation speed n of the engine 17 is the same.

For example, when the upper rotation body 5 is rotating, the operator is less likely to feel that the power is insufficient, even if the rotation speed n of the engine 17 somewhat decreases as compared with the case where the work instrument 3 is performing the digging work. For this reason, the rotation speed n of the engine 17 may further decrease when the upper rotation body 5 is rotating than when the work instrument 3 is performing the digging work. In this case, the rotation speed of the engine 17 decreases, and therefore, the fuel consumption is improved. It should be noted that the width of the change of the rotation speed of the engine 17 may be set in accordance with not only the rotation of the upper rotation body 5 but also operation of another actuator. In the present embodiment, the function of the matching minimum rotation speed calculation block 150 is achieved by the pump controller 33.

Figure 11:
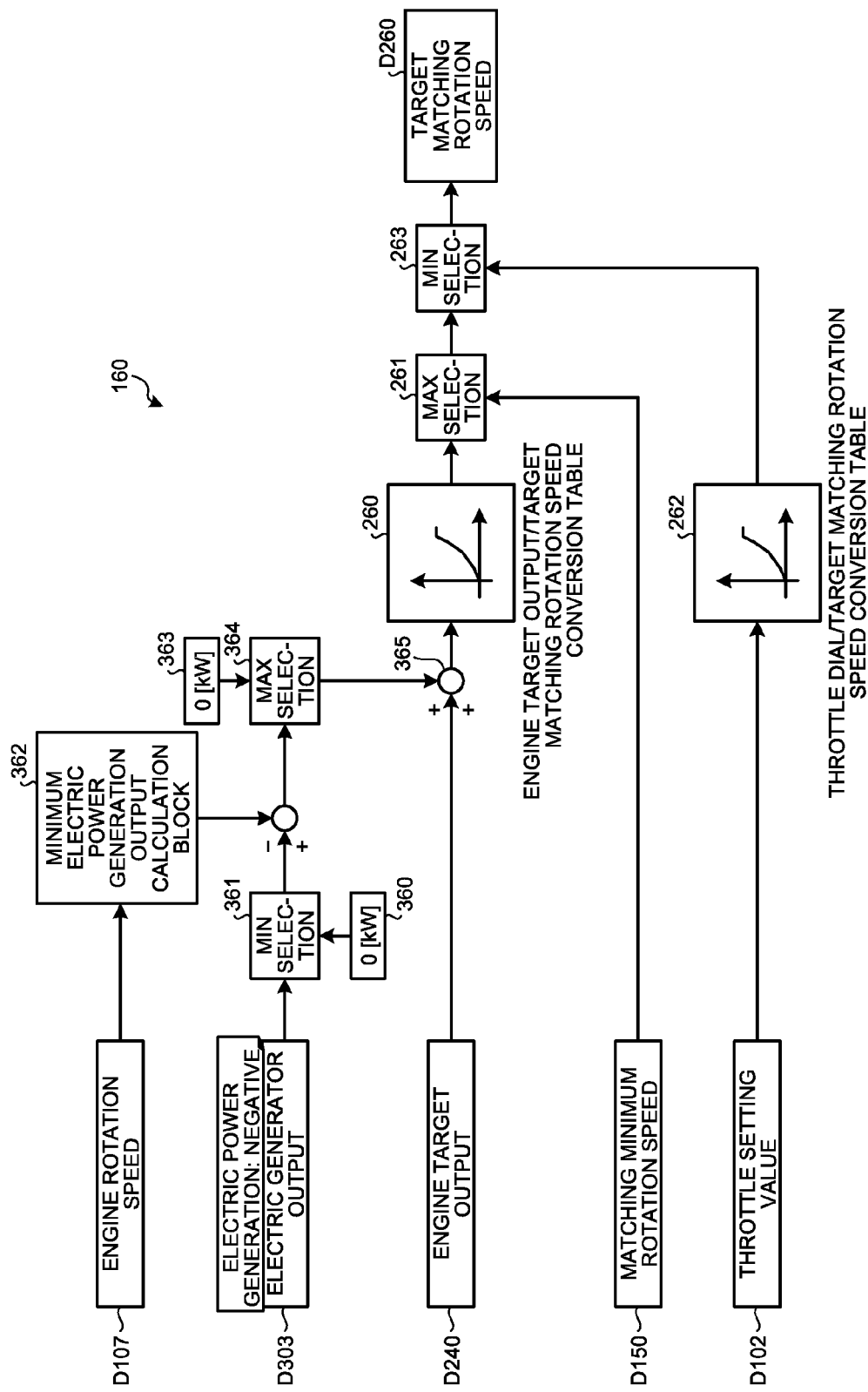
FIG. 11 is a figure illustrating a control flow of a target matching rotation speed calculation block.

FIG. 11 is a figure illustrating a control flow of a target matching rotation speed calculation block 160. As shown in FIG. 11, the target matching rotation speed calculation block 160 calculates the target matching rotation speed np1 (D260) as shown in FIG. 3. The target matching rotation speed D260 is the rotation speed of the engine 17 at the matching point MP1 where the engine target output D240 and the matching route ML crosses each other. The matching route ML is configured to pass the point where the fuel consumption rate is good when the engine 17 operates at a certain output. For this reason, the target matching rotation speed D260 is preferably determined at the matching point MP1 with the engine target output D240 on the matching route ML.

As described above, in the present embodiment, the target matching rotation number D260 is basically the rotation speed at the intersection point of the engine target output D240 and the target matching route ML. As shown in FIG. 8, the engine maximum output D230 is the value obtained by adding the fan horsepower and the electric generator output D303 to the pump output limit value. As shown in FIG. 9, the engine target output D240 is determined using the engine maximum output D230. Further, as shown in FIG. 11, the engine target output D240 is input, into the target matching rotation number calculation block 160, and the target matching rotation speed D260 is determined. The value of the target matching rotation speed D260 changes in accordance with the electric generator output D303 which is required for the electric power generator motor 19.

The electric power generator motor 19 has low efficiency when electric power is generated with a small electric power generation torque. For this reason, when the hybrid controller 23a as shown in FIG. 2 causes the electric power generator motor 19 to generate electric power, the hybrid controller 23a performs control so as to generate electric power with the minimum electric power generation torque or more that has been set in advance. As a result, when the electric power generator motor 19 changes from the non-electric Dower generation state (electric power generation OFF) to the electric power generation state (electric power generation ON), the ON/OFF state of electric power generation is switched at the border of the minimum electric power generation torque, and therefore, the electric generator output D303 changes in an discontinuous manner. When the matching point is determined at the intersection point between the engine target output D240 and the target matching route ML, the target matching rotation number D260 may greatly changes in response to switching of the ON/OFF state of the electric power generation in accordance with discontinuous change of the electric generator output D303.

For this reason, in the target matching rotation number calculation block 160, a minimum electric power generation output calculation block 362 uses the engine speed of the engine D107 to derive the minimum electric power generation output from the expression (3). In the expression (3), the value of the minimum electric power generation torque is a negative setting value.

minimum electric Dower generation output (kW)=2π/60×engine speed of the engine×minimum electric power generation torque÷1000    (3)

When the requested electric generator output D303 is less than the minimum electric power generation output derived, an adding unit 365 adds the output portion, which is insufficient for the minimum electric power generation output, to the engine target output D240. In the target matching rotation speed calculation block 160, an engine target output/target matching rotation speed conversion table 260 uses the engine target output, which is output from the adding unit 365, to calculate the candidate value of the target matching rotation speed. By doing so, the target matching rotation speed calculation block 160 suppresses the change of the target matching rotation number D260 which occurs in accordance with the ON/OFF state of the electric power generation.

When no electric generator output D303 is requested, a minimum value selection unit (MIN selection) 361 provided in a stage after the electric generator output D303 compares the input value and a zero value 360 in order to output zero when, e.g., the output of the engine 17 is assisted. Therefore, when no electric generator output D303 is requested, no value is added to the engine target output D240. When the requested electric generator output D303 is equal to or more than the minimum electric power Generation output, the minimum electric power generation output is not in sufficient, and therefore, it is not necessary to add any output to the engine target output D240. Therefore, a negative value is input into a maximum value selection unit (MAX selection) 364, and the maximum value selection unit 364 compares the input value and an zero value 363, and selects zero which is the maximum value as a result of the comparison, and outputs zero.

The engine target output/target matching rotation speed conversion table 260 receives the input, of the engine target output D240 derived by the engine target output calculation block 140 as shown in FIG. 5, derives the target matching rotation speed np1 at the matching point MP1 between the engine target output D240 and the matching route ML, and outputs it to a maximum value selection unit (MAX selection) 261.

According to the calculation with the matching minimum rotation speed calculation block 150 as shown in FIG. 10, when the width of the change of the rotation speed n of the engine 17 is reduced, the matching minimum rotation speed 5150 is more than the matching rotation number derived from the engine target output/target matching rotation speed conversion table 260. For this reason, the maximum value selection unit (MAX selection) 261 compares the target matching rotation speed np1 derived from the engine target output. D240 and the matching minimum rotation speed D150. Then, the maximum value selection unit 261 selects the maximum value, and adopts it as the candidate value of the target matching rotation speed 5260, thereby limiting the lower limit of the target matching rotation speed np1. In the example as shown in FIG. 3, when the low speed offset rotation speed is reduced, although being out of the matching route ML, the target matching point is MP3 instead of MP1, and the target matching rotation speed. D260 is np1 instead of np1.

Like the no-load maximum rotation speed D210 derived by the no-load maximum rotation speed calculation block 110 as shown in FIGS. 5 and 6, the upper limit of the target matching rotation speed. D260 is also limited by the throttle setting value D102. The target matching rotation speed calculation block 160 uses a throttle dial/target matching rotation speed conversion table 262 to convert the throttle setting value D102 into the candidate value of the target matching rotation speed. The throttle dial/target matching rotation speed conversion table 262 outputs the candidate value of the target matching rotation speed D260 to a minimum value selection unit (MIN selection) 263.

The minimum value selection unit 263 compares the candidate value of the target matching rotation speed D260 that is output from the throttle dial/target matching rotation speed conversion table 262 and the candidate value of the target matching rotation speed D260 selected by the maximum value selection unit 261. As a result of comparison, the minimum value selection unit 263 selects the minimum value from them both, and ultimately outputs it as the target matching rotation speed D260. In the present embodiment, the function of the target, matching rotation speed calculation block 160 is achieved by the pump controller 33.

Figure 12:
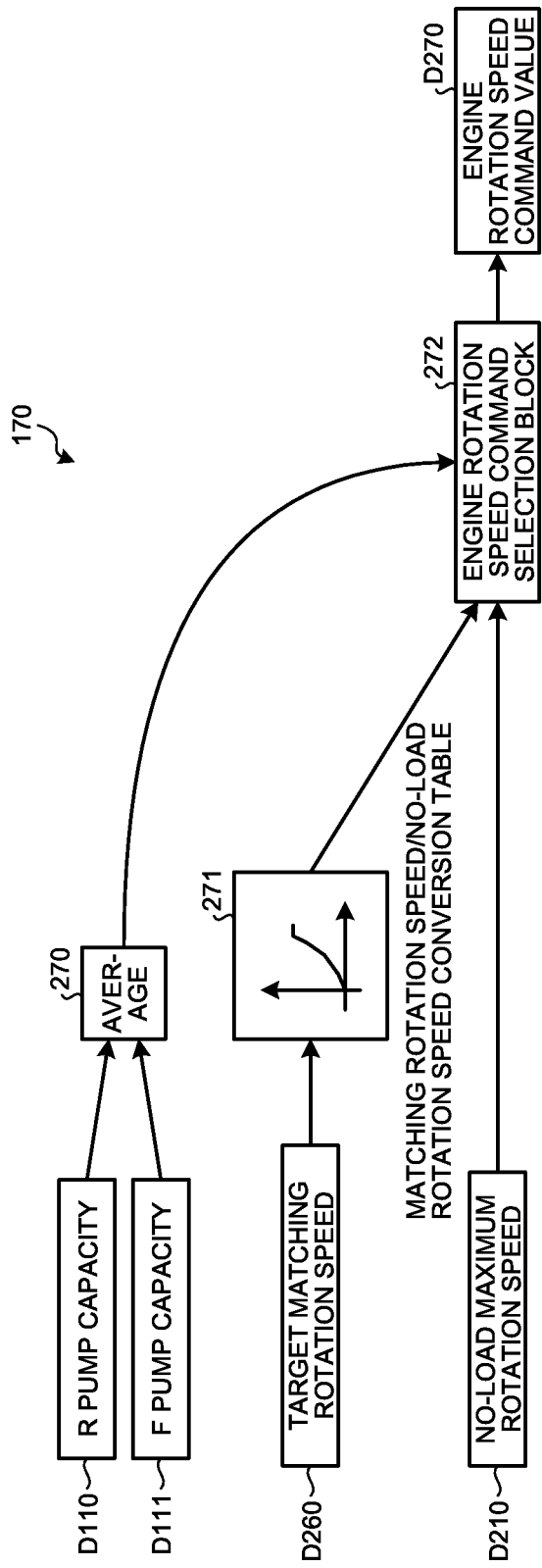
FIG. 12 is a figure illustrating a control flow of an engine rotation speed command value calculation block.

FIG. 12 is a figure illustrating a control flow of an engine rotation speed command value calculation block 170. As shown in FIG. 12, an average unit 270 of the engine rotation speed command value calculation block 170 uses the pump capacities D110, D111 derived on the basis of the awash plate angles detected by the awash plate angle sensors 18a of the two hydraulic pumps 18 to calculate an average pump capacity obtained by averaging the pump capacities D110, D111. An engine rotation speed command selection block 272 derives the engine rotation speed command value D270 (no-load maximum rotation speed np2) in accordance with the magnitude of the average pump capacity calculated by the average unit 270.

In this case, when the average pump capacity is more than a certain setting value (threshold value), the engine rotation speed command selection block 272 causes the engine rotation speed command value D270 to be closer to the no-load maximum rotation speed np2 (D210). More specifically, the rotation speed n of the engine 17 is increased. On the other hand, when the average pump capacity is less than a certain setting value, the engine rotation speed command selection block 272 causes the engine rotation speed command value D270 to be closer to the no-load minimum rotation speed nm1. More specifically, the rotation speed n of the engine 17 is reduced.

The rotation speed of the engine 17 obtained by moving the intersection point between the target matching rotation speed np1 (D260) and the matching point MP1 along the variable rotation speed limitation line VL2" passing the matching point MP1 to the position where the torque T is zero, i.e., to the horizontal axis, is defined as a no-load rotation speed np1a. The value obtained by adding the lower limit rotation speed offset value Δ mm to the no-load rotation speed np1a is called a no-load minimum rotation speed nm1. It should be noted that the conversion into the no-load rotation speed np1a corresponding to the target matching rotation speed D260 is performed by, for example, a matching rotation speed/no-load rotation speed conversion table 271. As described above, according to the state of the pump capacity, the engine rotation speed command value D270 is determined between the no-load minimum rotation speed nm1 and the no-load maximum rotation speed np2. The lower limit rotation speed offset value Δ nm is a value that is set in advance, and is stored to, for example, the storage device, of the pump controller 33.

This will be explained more specifically. When the average pump capacity is more than a setting value q_com1, the engine rotation speed command value calculation block 170 causes the engine rotation speed command value D270 to be closer to the no-load maximum rotation speed np2. When the average pump capacity is less than the setting value q_com1, the engine rotation speed command value calculation block 170 uses the expression (4) to derive the engine rotation speed command value D270.

engine rotation speed command value $D270$=rotation speed obtained by converting target matching rotation speed $np1$ into no-load rotation speed $np1a$+lower limit rotation speed offset value $\Delta$ nm  (4)

The engine rotation speed command value calculation block 170 can generate the variable rotation speed limitation line VL2 using the engine rotation speed command value D270 thus derived. As a result, when the pump capacity has margin (the average pump capacity is less than a certain setting value), then the machine control device reduces the rotation speed n of the engine 17 as shown in FIG. 3. More specifically, the rotation speed of the engine 17 can be the no-load minimum rotation speed nm1, and the fuel consumption is reduced and the fuel consumption can be improved. The setting value q_com1 is a value that is set in advance, and is stored to the memory of the pump controller 33. It should be noted that the setting value q_com1 may be provided with two different setting values by dividing the side where the rotation speed n of the engine 17 increases and the side where the rotation, speed n of the engine 17 decreases, and a range where the rotation speed of the engine 17 does not change may be provided. In the present embodiment, the function of the engine rotation speed command value calculation block 170 is achieved by the pump controller 33.

Figure 13:
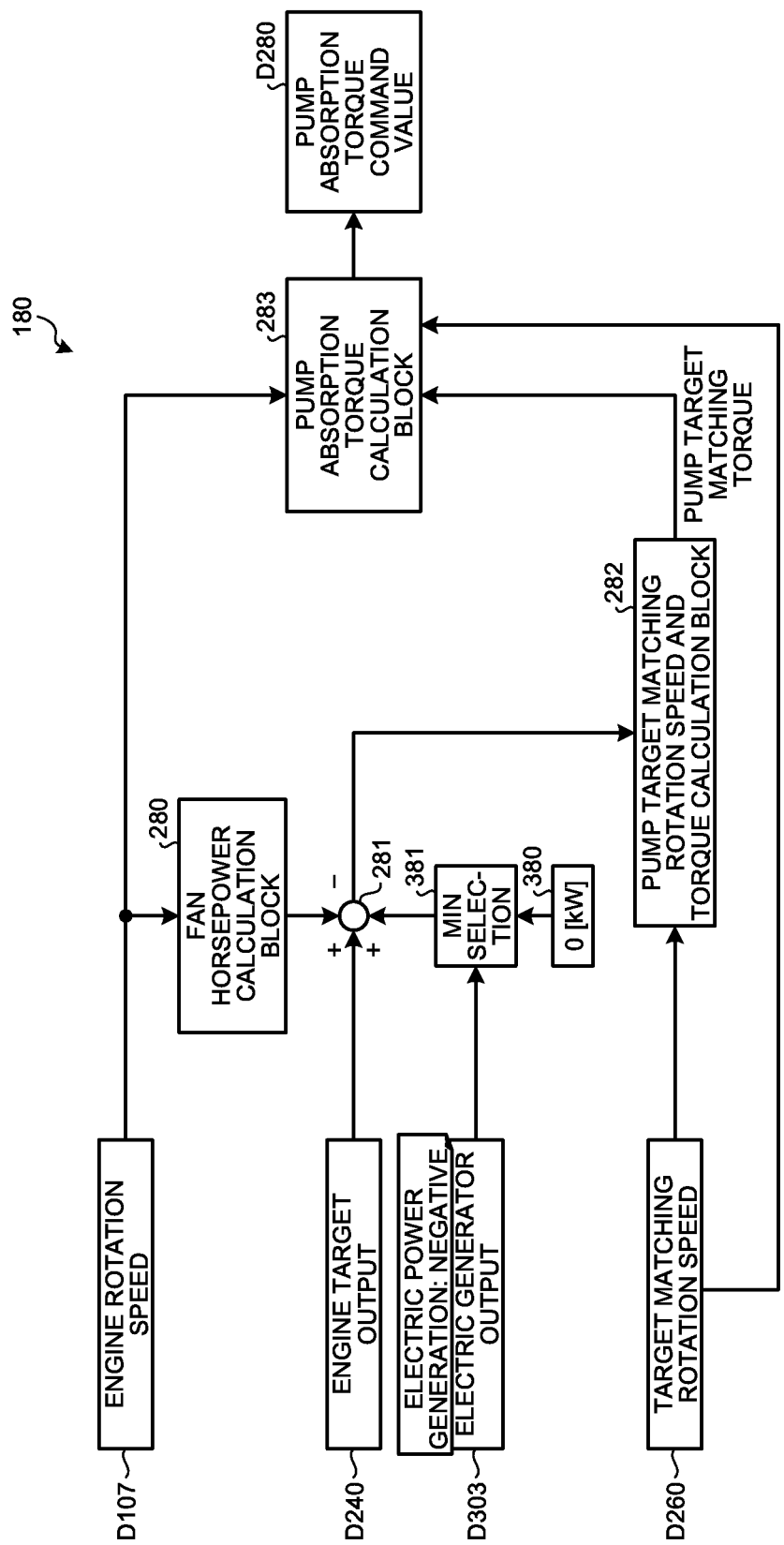
FIG. 13 is a figure illustrating a control flow of a pump absorption torque command value calculation block.
Figure 14:
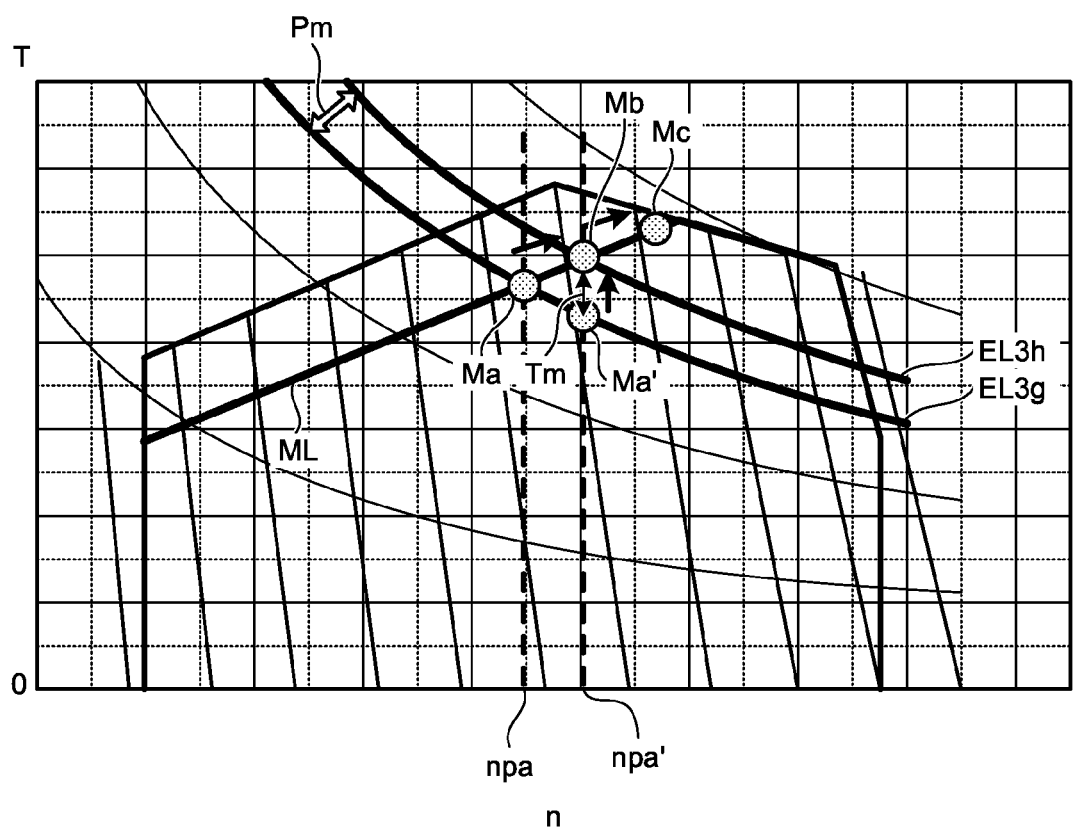
FIG. 14 is a figure illustrating an example of a torque diagram.

FIG. 13 is a figure illustrating a control flow of the pump absorption torque command value calculation block 180. FIG. 14 is a figure illustrating an example of a torque diagram. In the present embodiment, the function of the pump absorption torque command value calculation block 180 is achieved by the pump controller 33. The pump absorption torque command value calculation block 180 uses the current engine rotation speed D107, the engine target output D240, and the target matching rotation speed D260 to derive the pump absorption torque command value D280. A fan horsepower calculation block 280 calculates the fan horsepower using the engine rotation speed D107. It should be noted that the fan horsepower is derived using the expression (4) explained above.

When the pump absorption torque command value is derived, a pump target matching rotation speed and torque calculation block 282 uses the output (pump target absorption horsepower) obtained by subtracting not only the fan horsepower but also the electric generator output D303 from the engine target output D240. The value of the requested electric generator output D303 is negative. For this reason, a minimum value selection unit (MIN selection) 381 selects the minimum value in the comparison with a zero value 380, and the selected minimum value is added by a calculation unit 281 to the engine target output D240, which means that the electric generator output D303 is substantially subtracted from the engine target output D240.

When the electric power generation is in the OFF state, as shown in FIG. 14, an intersection point between the target matching route ML and the third equal throttle line EL3g indicating the engine target output D240 in the OFF state of the electric power generation is a target matching point Ma. When the electric power generation is in the OFF state, the target matching rotation speed D260 calculated by the target matching rotation speed calculation block 160 explained above is a rotation speed npa at the target matching point. Ma.

When the electric power generator motor 19 generates electric power at the minimum electric power generation output Pm, the third equal throttle line EL3 is a third equal throttle line ELM indicating the engine target output D240 for satisfying the minimum electric power generation output Pm. In this case, the intersection point between the third equal throttle line EL3h and the target matching route ML is a target matching point Mb. When the electric power generator motor 19 generates electric power at the minimum electric power generation output Pm, the target matching rotation speed D260 calculated by the target matching rotation speed calculation block 160 explained above is a rotation speed npa' at the target matching point Ma.

When the engine control as shown in FIG. 12 is not executed, electric power generation of which output is smaller than the minimum electric power generation output Pm produces small electric power generation output in reality. For this reason, the target matching point goes back and forth between Ma and Mb in response to the ON/OFF state of the electric power generation of the electric power generator motor 19, and therefore, the target matching rotation speed D260 also frequently changes in the present embodiment, when the electric power generator motor 19 generates electric power with an output less than the minimum electric power generation output Pm, the target matching rotation speed is changed to near in advance when the electric power generation is in the OFF state. For this reason, the target matching rotation speed D260 does not change in response to the ON/OFF state of the electric power generation of the electric power generator motor 19. The target matching point in the OFF state of the electric power generation is the intersection point Ma' between the third equal throttle line EL3g and the target matching rotation speed npa'.

Therefore, when the engine control as shown in FIG. 12 is not executed, the matching point changes from Ma to Mb and then to Mc as the electric generator output D303 increases, but in the present embodiment, the matching point changes from Ma' to Mb and then to Mc as the electric generator output D303 increases.

The subtraction unit 281 derives the output (pump target absorption horsepower) obtained by subtracting the fan horsepower from the value obtained by adding the output value of a minimum value selection unit 381 to the engine target output D240 derived by the engine target output calculation block 140. Then, the subtraction unit 281 inputs the derived value into the pump target matching rotation speed and torque calculation block 282. This target matching rotation speed and torque calculation block 282 also receives the target matching rotation speed D260 derived by the target matching rotation speed calculation block 160. The target matching rotation speed D260 is the target matching rotation speed of the hydraulic pump 18 (pump target matching rotation speed). The pump target matching rotation speed and torque calculation block 232 calculates the pump target matching torque as shown in the expression (5). The pump target matching torque calculated by the pump target matching rotation speed and torque calculation block 282 is output to a pump absorption torque calculation block 283.

$$\text{pump target matching torque} = (60 \times 1000 \times (\text{engine target output} - \text{fan horsepower}))/(2\pi \times \text{target matching rotation speed}) \quad (5)$$

The pump absorption torque calculation block 283 receives the pump target matching torque which is output from the pump target matching rotation speed and torque calculation block 282, the engine rotation speed D107 detected by the rotation speed detection sensor 17C as shown in FIG. 2, and the target matching rotation speed D260. The pump absorption torque calculation block 283 calculates the pump absorption torque as shown in the following expression in the expression (5). In the expression (6), Kp denotes the control gain. The pump absorption torque calculation block 283 outputs the pump absorption torque command value D280 which is the calculation result.

$$\text{pump absorption torque} = \text{pump target matching torque} - Kp \times (\text{target matching rotation speed} - \text{engine speed of the engine}) \quad (6)$$

According to such control flow, when the current 1G engine rotation speed D107 is more than the target matching rotation speed D260, the pump absorption torque command value D280 increases as can be understood from the above expression. When the current engine rotation speed D107 is less than the target matching rotation speed D260, the pump absorption torque command value D280 decreases. On the other hand, the output of the engine 17 is controlled so that the engine target output D240 becomes the upper limit, and therefore, as a result, the rotation speed n of the engine 17 stabilizes at the number of rotations close to the target matching rotation speed D260.

The engine rotation speed command value calculation block 170 can derive the minimum value of the engine rotation speed command value D270 according to the expression (3) as described above with respect to the target matching rotation speed D260, the variable rotation speed limitation line VL2 is set at a high rotation speed to which at least the lower limit rotation speed offset value Δn m is added. For this reason, according to the present embodiment, even if the actual absorption torque of the hydraulic pump 18 (pump actual absorption torque) is somewhat varies with respect to the pump absorption torque command, matching can be attained in a range that does not come over the variable rotation speed limitation line VL2. In the present embodiment, the output of the engine 17 is controlled to be constant on the third equal throttle line EL3, and therefore, even in a case where the matching rotation speed of the engine 17 somewhat varies or in a case where the actual absorption torque (pump actual absorption torque) somewhat varies with respect to the pump absorption torque command, the change of the output of the engine 17 can be reduced. As a result, the variation of the fuel consumption can be suppressed to a small level, and the specification of the fuel consumption of the excavator 1 can be satisfied. The specification of the fuel consumption is, for example, a specification stating that the fuel consumption can be reduced by 10% as compared with a conventional excavator.

As described above, in the present embodiment, the driving state of the engine 17 is controlled on the basis of the command value of the throttle and information about the first equal throttle line EL1, the second equal throttle line EL2, and the third equal throttle line EL3 obtained by interpolating the first equal throttle line EL1 and the second equal throttle line EL2. For this reason, in the present embodiment, the driving state of the engine 17 can be controlled using the command value of the throttle that can be generated relatively easily, and therefore, the flexibility and the versatility are improved when the driving state of the engine 17 is controlled.

As described above, in the present embodiment, when the engine 17 provided on the excavator 1 serving as the work machine is controlled, the command value based on the fuel adjustment dial or the command value of the same type as this is given to the engine controller 30 to allow the engine 17 to be controlled. In the present embodiment, the new control device and new control method for the engine provided on the excavator 1 can be suggested.

In the control of the engine 17 according to the present embodiment, the driving state of the engine 17 can be controlled accordingly to only the setting value of the throttle (command value). Therefore, in the control of the engine 17 according to the present embodiment, the engine 17 can be controlled by only generating the setting value of the throttle without using the pump controller 33 or another control device, and therefore, the flexibility and versatility are improved when the driving state of the engine 17 is controlled. The setting value of the throttle is expressed by a percentage between 0% and 100%, and can therefore be generated relatively easily. For this reason, the engine 17 can be controlled relatively easily by using the setting value of the throttle.

In the present embodiment, the first equal throttle line EL1 is the equal engine horse power line defined so that the output of the engine 17 becomes constant, and the output at the rotation speed at the rated output is defined to be more than the rated output. The second equal throttle line EL2 is such that, as the rotation speed n of the engine 17 increases, the torque T of the engine 17 decreases in accordance with a linear function, on the basis of the frictional torque Ti of the engine 17. The third equal throttle line EL3 is obtained by interpolating the first equal throttle line EL1 and the second equal throttle line EL2. By doing so, the relationship between the third equal throttle line EL3 and the equal engine horse power line EP can be the relationship explained above.

In the control of the engine 17 according to the present embodiment, the equal engine horse power line EP and the third equal throttle line EL3 are matched on the matching route ML. When the rotation speed n of the engine 17 is more than the matching route ML, the third equal throttle line 5L3 is larger than the equal engine horse power line 52 when compared at the same rotation speed n. Further, when the rotation speed n of the engine 17 is less than the matching route ML, the equal engine horse power line EP is larger than the third equal throttle line EL3 when compared at the same rotation speed n. In the control of the engine 17 according to the present embodiment, the relationship between the third equal throttle line EL3 and the equal engine horse power line 52 is such relationship. As a result, in the control of the engine 17 according to the present embodiment, when the amount of flow of the hydraulic pump 18 is required after the load for the work instrument 3 decreases, the fuel consumption of the engine 17 can be improved while ensuring the amount of flow of the operation oil. When the operation oil is required to have a high pressure, the third equal throttle line EL3$d$ corresponding to the equal engine horse power line EPd is used rather than the equal engine horse power line EPd, and therefore, the engine 17 can generate a larger torque T in the control of the engine 17 according to the present embodiment.

Since the variable rotation speed limitation line VL2 has an inclination h1, there is an advantage in that matching with the third equal throttle line EL3 can be attained.

In the control of the engine 17 according to the present embodiment, the torque T in the first equal throttle line EL1 is higher than the maximum torque line TL of the engine 17 at each rotation speed n of the engine 17. In this configuration, when there is delay in communicator with another control device or the environment where the engine 17 is used changes, the output of the engine 17 is less likely to be more than the value defined by the maximum torque line TL in the control of the engine 17 according to the present embodiment. As a result, the engine 17 is less likely to be used with an overload.

When the control of the engine 17 according to the present embodiment is executed, the rotation speed of the engine 17 need to be increased in a short time. When the target matching rotation speed D260 of the engine 17 greatly deviates from the actual rotation speed n of the engine, the rotation speed n of the engine 17 needs to be increased. In the present embodiment, the output shaft of the engine 17 is coupled with the electric power generator motor 19, and therefore, the rotation speed n of the engine 17 can be increased by causing to the electric power generator motor 19 to operate in the power-running state. As a result, the workability of the excavator can be ensured. As described above, the control of the engine 17 according to the present embodiment is preferable for a hybrid work machine.

In the present embodiment, the excavator 1 having the engine 17 is an example of work vehicle, but the work vehicle to which the present embodiment can be applied is not limited thereto. For example, the work vehicle may be a wheel, loader, a bulldozer, a dump truck, and the like. The type of the engine provided in the work machine is not limited. The work machine may not be a hybrid method.

The present embodiment has been hereinabove explained, but the present embodiment is not limited by the contents described above. The constituent elements described above include those that can be easily conceived of by a person skilled in the art and those substantially the same, i.e., those in a range of so-called equivalent. Further, the above constituent elements may be combined as necessary. Still further, the constituent elements may be omitted, replaced, or changed in various manners without deviating from the gist of the present embodiment.

REFERENCE SIGNS LIST 1 excavator
1PS driving system
2 vehicle main body
3 work instrument
4 lower running body
5 upper rotation body
14 boom cylinder (hydraulic cylinder)
15 arm cylinder (hydraulic cylinder)
16 bucket cylinder (hydraulic cylinder)
17 engine
17S rotation speed detection sensor
18 hydraulic pump
18$a$ swash plate angle sensor
20 control valve
20$a$ pump pressure detection unit
27 lever manipulation amount detection unit
27S pressure sensor
28 throttle dial
30 engine controller
31 rotation hydraulic motor
32 common rail control unit
33 pump controller
EL1 first equal throttle line
EL2 second equal throttle line
EL3 third equal throttle line
EP equal engine horse power line
ML matching route

The invention claimed is:
1. A control device of an internal combustion engine, wherein when the control device controls the internal com- bustion engine that is provided in a work machine and that serves as a power source for the work machine, a driving state of the work machine is detected, and based on the detected driving state, the control device controls driving state of the internal combustion engine by using:
a first relationship of a torque and a rotation speed of the internal combustion engine which is defined to correspond to a case where an amount of fuel injection for the internal combustion engine is maximum at each rotation speed of the internal combustion engine and so that an output at a rotation speed to generate a rated output of the internal combustion engine is equal to or more than the rated output;
a second relationship of the torque and the rotation speed of the internal combustion engine which is defined to correspond to a case where the amount of fuel injection for the internal combustion engine is zero at each rotation speed of the internal combustion engine and so that the torque of the internal combustion engine decreases in accordance with increase of the rotation speed of the internal combustion engine, where a point where the torque and the rotation speed of the internal combustion engine are zero is defined as a start point; and
a third relationship which is a relationship of the torque and the rotation speed of the internal combustion engine, which is obtained from the first relationship and the second relationship.

2. The control device of the internal combustion engine according to claim 1, wherein the driving state of the internal combustion engine is controlled using the third relationship that matches:
a fourth relationship of the torque and the rotation speed of the internal combustion engine which is defined so that an output of the internal combustion engine becomes constant; and
a fifth relationship of the torque and the rotation speed of the internal combustion engine which is set so that a fuel consumption rate with respect to the output of the internal combustion engine becomes the smallest.

3. The control device of the internal combustion engine according to claim 2, wherein the driving state of the internal combustion engine is controlled so as to attain the rotation speed and the torque where the third relationship matches the fifth relationship.

4. The control device of the internal combustion engine according to claim 1, wherein further, the driving state when a load of the internal combustion engine decreases is controlled using a sixth relationship of the torque and the rotation speed of the internal combustion engine, which is defined from a no-load maximum rotation speed which is a maximum rotation speed of the internal combustion engine when the load of the work machine decreases.

5. The control device of the internal combustion engine according to claim 4, wherein the sixth relationship is a relationship in which, as the rotation speed increases, the torque decreases.

6. The control device of the internal combustion engine according to claim 1, wherein the first relationship is defined to attain an output larger than an upper limit value that can be actually output by the internal combustion engine.

7. The work machine according to claim 1, comprising:
the internal combustion engine;
an electric power generator motor driven by the internal combustion engine;
a battery device accumulating electric power;
an electric motor that is driven by receiving the electric power discharged from the battery device or electric power generated by the electric power generator motor.

8. A work machine comprising:
an internal combustion engine; and
a control device of the internal combustion engine,
wherein a driving state of the work machine is detected, and based on the detected driving state, the control device controls driving state of the internal combustion engine by using:
a first relationship of a torque and a rotation speed of the internal combustion engine which is defined to correspond to a case where an amount of fuel injection for the internal combustion engine is maximum at each rotation speed of the internal combustion engine and so that an output at a rotation speed to generate a rated output of the internal combustion engine is equal to or more than the rated output;
a second relationship of the torque and the rotation speed of the internal combustion engine which is defined to correspond to a case where the amount of fuel injection for the internal combustion engine is zero at each rotation speed of the internal combustion engine and so that the torque of the internal combustion engine decreases in accordance with increase of the rotation speed of the internal combustion engine, where a point where the torque and the rotation speed of the internal combustion engine are zero is defined as a start point; and
a third relationship which is a relationship of the torque and the rotation speed of the internal combustion engine, which is obtained from the first relationship and the second relationship, and
wherein the driving state of the internal combustion engine is controlled using the third relationship that matches:
a fourth relationship of the torque and the rotation speed of the internal combustion engine which is defined so that an output corresponding to a command value of an output of the internal combustion engine becomes constant; and
a fifth relationship of the torque and the rotation speed of the internal combustion engine which is set so that a fuel consumption rate with respect to the output of the internal combustion engine becomes the smallest, and
wherein further, the driving state when a load of the internal combustion engine decreases is controlled using a sixth relationship of the torque and the rotation speed of the internal combustion engine, which is defined from a no-load maximum rotation speed which is a maximum rotation speed of the internal combustion engine when the load of the work machine decreases.

9. The work machine according to claim 8, comprising:
the internal combustion engine;
an electric power generator motor driven by the internal combustion engine;
a battery device accumulating electric power;
an electric motor that is driven by receiving the electric power discharged from the battery device or electric power generated by the electric power generator motor.

10. A control method of an internal combustion engine, wherein when the internal combustion engine that is provided in a work machine and that serves as a power source for the work machine is controlled, the control method comprising:
detecting driving state of the work machine, and
based on the detected driving state, controlling the driving state of the internal combustion engine by using:
a first relationship of a torque and a rotation speed of the internal combustion engine which is defined to correspond to a case where an amount of fuel injection for the internal combustion engine is maximum at each rotation speed of the internal combustion engine and so that an output at a rotation speed to generate a rated output of the internal combustion engine is equal to or more than the rated output;

a second relationship of the torque and the rotation speed of the internal combustion engine which is defined to correspond to a case where the amount of fuel injection for the internal combustion engine is zero at each rotation speed of the internal combustion engine and so that the torque of the internal combustion engine decreases in accordance with increase of the rotation speed of the internal combustion engine, where a point where the torque and the rotation speed of the internal combustion engine are zero is defined as a start point; and a third relationship which is a relationship of the torque and the rotation speed of the internal combustion engine, which is obtained from the first relationship and the second relationship.

11. The control method of the internal combustion engine according to claim 10, wherein the controlling includes using the third relationship that matches a fourth relationship of the torque and the rotation speed of the internal combustion engine which is defined so that an output of the internal combustion engine becomes constant and a fifth relationship of the torque and the rotation speed of the internal combustion engine which is set so that a fuel consumption rate with respect to the output of the internal combustion engine becomes the smallest to cause the internal combustion engine to generate an output corresponding to the fourth relationship.

12. The control method of the internal combustion engine according to claim 11, wherein the controlling includes controlling the driving state of the internal combustion engine so as to attain the rotation speed and the torque where the third relationship matches the fifth relationship.

* * * * *